US009349342B2

(12) United States Patent
Zhang et al.

(10) Patent No.: US 9,349,342 B2
(45) Date of Patent: May 24, 2016

(54) DISPLAY METHOD AND ELECTRONIC DEVICE

(71) Applicants: Beijing Lenovo Software Ltd, Beijing (CN); Lenovo (Beijing) Co., Ltd., Beijing (CN)

(72) Inventors: Bo Zhang, Beijing (CN); Chunlei Zhao, Beijing (CN); Dejun Wang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 399 days.

(21) Appl. No.: 13/785,411

(22) Filed: Mar. 5, 2013

(65) Prior Publication Data

US 2013/0229324 A1 Sep. 5, 2013

(30) Foreign Application Priority Data

Mar. 5, 2012 (CN) .......................... 2012 1 0055794
Dec. 13, 2012 (CN) .......................... 2012 1 0541267

(51) Int. Cl.
*G09G 5/00* (2006.01)
*G06F 3/14* (2006.01)
*G09G 5/14* (2006.01)
*G06F 1/16* (2006.01)

(52) U.S. Cl.
CPC ................ *G09G 5/00* (2013.01); *G06F 1/1641* (2013.01); *G06F 1/1652* (2013.01); *G06F 3/1446* (2013.01); *G09G 5/14* (2013.01); *G09G 2340/12* (2013.01)

(58) Field of Classification Search
CPC ...................................................... G09G 5/00
See application file for complete search history.

(56) References Cited

U.S. PATENT DOCUMENTS

| 2007/0097014 | A1 | 5/2007 | Solomon et al. |
| 2010/0182265 | A1* | 7/2010 | Kim et al. ..................... 345/173 |
| 2011/0086680 | A1* | 4/2011 | Kim et al. ..................... 455/574 |
| 2011/0134144 | A1* | 6/2011 | Moriwaki ............ G09G 3/3208 345/660 |
| 2012/0115422 | A1* | 5/2012 | Tziortzis et al. ................ 455/73 |

FOREIGN PATENT DOCUMENTS

| CN | 201248078 Y | 5/2009 |
| CN | 201409149 Y | 2/2010 |

OTHER PUBLICATIONS

First Chinese Office Action regarding Application No. 201210055794.2 dated Jul. 22, 2014. English translation provided by Unitalen Attorneys at Law.

* cited by examiner

*Primary Examiner* — Jason Olson
(74) *Attorney, Agent, or Firm* — Harness, Dickey & Pierce, P.L.C.

(57) ABSTRACT

A display method and an electronic device are provided. The display method is applied to the electronic device, and includes: displaying each display object of the display unit according to a first display parameter, monitoring the operation state of the electronic device to obtain a monitored result; acquiring a display adjusting command if the monitored result indicates that a fold or unfold operation is performed on the electronic device; adjusting the first display parameter of at least one display object of the display unit according to the display adjusting command to generate a second display parameter, and displaying the at least one display object according to the second display parameter.

23 Claims, 24 Drawing Sheets

DISPLAY METHOD AND ELECTRONIC DEVICE

CROSS-REFERENCE TO RELATED APPLICATIONS

The present application claims the priorities to Chinese patent application No. 201210055794.2, titled "DISPLAY METHOD AND ELECTRONIC DEVICE", filed with Chinese State Intellectual Property Office on Mar. 5, 2012, and Chinese patent application No. 201210541267.2, titled "INFORMATION PROCESSING METHOD AND ELECTRONIC DEVICE", filed with Chinese State Intellectual Property Office on Dec. 13, 2012, which are hereby incorporated by reference in their entirety.

FIELD OF THE INVENTION

The present invention relates to the field of electronic technique, and particularly to a display method and an electronic device.

BACKGROUND OF THE INVENTION

Bodies of mobile terminals are expected to be smaller and smaller, and screens thereof are expected to be bigger and bigger. Therefore, mobile phones such as slider phones or flip phones are designed, for which the weight is decreased and the display area is increased, however, the problem that the display screen is small is still not perfectly solved. With increasing development of science and technology, nowadays, foldable devices become popular due to their small volume and light weight, which is convenient in our daily life. Foldable screens become a development trend.

As to the mobile phone, the traditional foldable phone employs fold design in which the screen and the keyboard of the phone are separate, the display screen may be designed to be a two layer foldable display screen by using special material, and the back side of the display screen is also able to display contents. In such design, the display area is easily to be doubled, and the increased screen area makes the operation of the mobile phone more and more like that of desktop PC.

The existing phone with foldable screen, after being folded, still displays content for the full screen, and thus operations on part of the screen are not convenient and some contents cannot be seen by the user after the fold operation. Therefore, the usage for the user after the fold operation is not convenient. Furthermore, since icons or words displayed in the folded region will be bent, there may be no response when the icons or words are clicked, or the response is not for the clicked words or icons. Therefore, the response is not exact, or even wrong.

SUMMARY OF THE INVENTION

In view of the above, in the present invention, it is provided an improved display method and device.

According to an aspect of the present invention, it is provided a display method, which is used in an electronic device, the electronic device comprises a display unit, the display unit comprises a first display region and a second display region, the electronic device has at least a first operation state and a second operation state, the electronic device performs operation state switch if a deformation occurs in the display unit, wherein the operation state switch comprises switching from the first operation state to the second operation state and switching from the second operation state to the first operation state, the method comprises:

displaying each display object of the display unit according to a first display parameter if the electronic device is in the first operation state or the second operation state;

monitoring the operation state of the electronic device to obtain a monitored result;

acquiring a display adjusting command if the monitored result indicates that the electronic device is performing the operation state switch;

adjusting the first display parameter of at least one display object of the display unit according to the display adjusting command, to generate a second display parameter of the at least one display object; and displaying the at least one display object according to the second display parameter.

According to another aspect of the present invention, it is provided an electronic device, comprising:

a display unit, configured to display each display object according to a first display parameter or a second display parameter, the display unit comprising a first display region and a second display region, the electronic device having at least a first operation state and a second operation state, the electronic device performing operation state switch if a deformation occurs in the display unit, wherein the operation state switch comprises switching from the first operation state to the second operation state and switching from the second operation state to the first operation state;

an operation state monitoring unit, configured to monitor the operation state of the electronic device to obtain a monitored result;

an adjusting command acquiring unit, configured to acquire a display adjusting command if the monitored result indicates that the electronic device is performing the operation state switch;

a display adjusting unit, configured to adjust the first display parameter of at least one display object of the display unit according to the display adjusting command to generate the second display parameter of the at least one display object, so that the display unit displays the at least one display object according to the second display parameter.

DETAILED DESCRIPTION OF THE INVENTION

Figure 1:
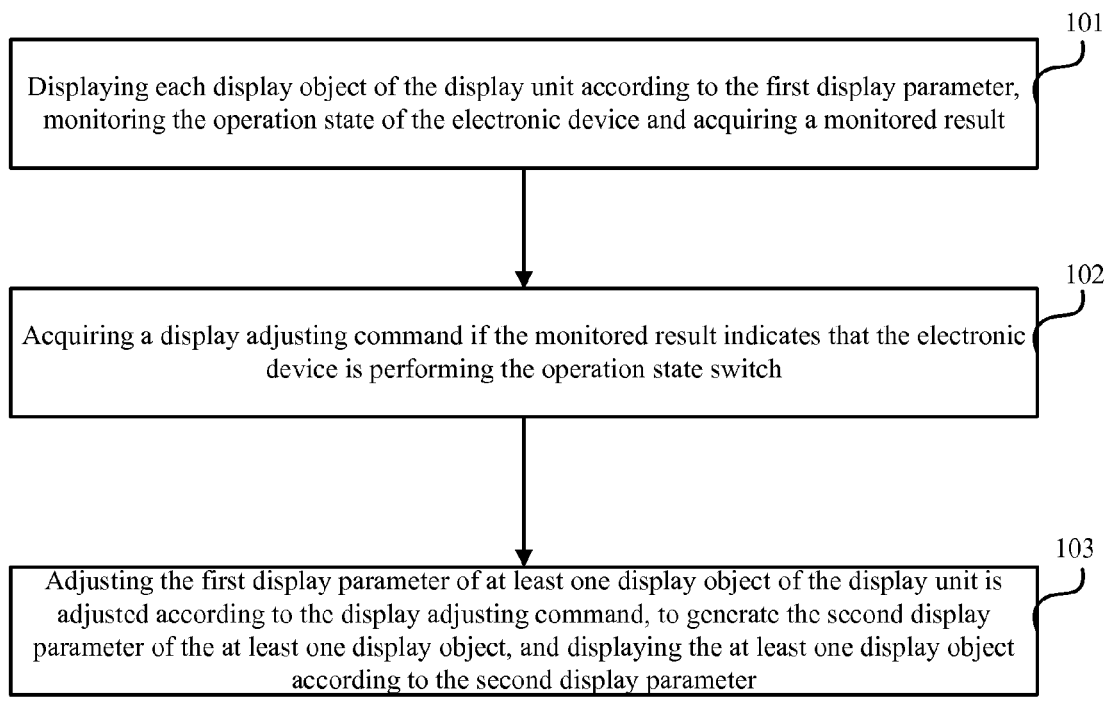
FIG. 1 is a schematic flowchart of a display method according to an embodiment of the present invention.

The subject described herein may be implemented by hardware, software, firmware or other combinations. Terms "function", "unit", "module" or "sub-module" used herein refer to hardware, software and/or firmware used to achieve the described features. In an illustrated implementation, the subject described herein may be implemented by computer readable medium on which computer executable instructions are stored. Steps are performed when the computer executable instructions are performed by the processor of the computer. Illustrated computer readable medium applicable to the subject herein includes disk storage device, chip storage device, programmable logic device and dedicate integrated circuit. Furthermore, the computer program product implementing the subject herein may be set on signal device or computer platform, or may be distributed among various devices or computer platforms.

According to an aspect, a display method is provided by an embodiment of the present invention. The method is used in an electronic device, the electronic device includes a display unit, the display unit includes a first display region and a second display region, the electronic device has at least a first operation state and a second operation state, the electronic device performs operation state switch if the display unit is deformed. The method includes: displaying each display object of the display unit according to a first display parameter if the electronic device is in the first operation state or the second operation state; monitoring the operation state of the electronic device to obtain a monitored result; acquiring a display adjusting command if the monitored result indicates that the electronic device is performing the operation state switch, wherein the operation state switch comprises switching from the first operation state to the second operation state and switching from the second operation state to the first operation state; adjusting the first display parameter of at least one display object of the display unit according to the display adjusting command to generate a second display parameter of the at least one display object; and displaying the at least one display object according to the second display parameter. In an embodiment, the first display region and the second display region are in a same plane if the electronic device is in the first operation state, and the first display region and the second display region are in different planes if the electronic device is in the second operation state.

As to existing mobile phone with foldable screen, the original big screen will be divided into multiple sub-screens (usually two sub-screens, i.e., the first display region and the second display region) by fold lines after fold operation. However, the display content, which was displayed for the full screen before the fold operation, is still displayed for the full screen. After the fold operation, the user can only see the sub-screen facing the user, so if the content is still displayed for the full screen after the fold operation, operations for part of the screen are not convenient and some display contents can not be seen by the user. Therefore, the operation is not convenient for the user after the fold operation. In view of the above problem, followed solutions are provided by embodiments of the present invention. Methods provided by embodiments of the present invention will be described in detail in connection with drawings below.

FIG. 1 illustrates a display method according to an embodiment of the present invention, which is used in an electronic device. The electronic device includes a display unit, and the display unit includes a first display region and a second display region. The electronic device has at least a first operation state and a second operation state. The first display region and the second display region are in a same plane if the electronic device is in the first operation state, and the display region formed by the first display region and the second display region in the same plane may be defined as a plane display region herein. The first display region and the second display region are in different planes if the electronic device is in the second operation state.

In the embodiment of the present invention, the display unit may be a splicing screen (also referred as joined screen), or may be a flexible display screen. For the splicing screen, it means that the display unit includes a first display sub-unit and a second display sub-unit, the first display sub-unit is connected with the second display sub-unit via a pivot component, so that the first display sub-unit and the second display sub-unit may pivot relatively with the pivot component being used as the axis, and the angle between the first display sub-unit and the second display sub-unit ranges from 0 to 360 degree. For the flexible display screen, it means that the display unit is made of flexible material, and the original display screen may be divided into multiple small display sub-regions by user's fold operation.

In the embodiment of the present invention, for the splicing screen, the first display region and the second display region are the first display sub-unit and the second display sub-unit of the splicing screen. For the flexible display screen, the first display region and the second display region are display sub-regions divided by the fold operation. In the embodiment of the present invention, only adjustments of the display object for switching between fold and unfold states in two display sub-regions are described, and in specific implementations, the described method is also applicable to the adjustment of the display object for state switch of multiple display sub-screens.

In step 101, when the electronic device is in the first operation state or the second operation state, each display object of the display unit is displayed according to a first display parameter, the operation state of the electronic device is monitored and the monitored result is obtained.

The first display parameter is a control parameter for displaying the display object in the screen by the electronic device. In specific implementations, there may be various control parameters. In the present invention, the effect of the adjustment for the display object is that: one or more display objects in the original display region are adjusted to be complete in any of the display regions after the operation state switch being performed, and thus the first display parameter of the embodiment of the present invention may be one or more of position parameter, display direction parameter and display area parameter of the display object.

In step 102, if the monitored result indicates that the electronic device performs the operation state switch, the display adjusting command is obtained, where the operation state switch includes switching from the first operation state to the second operation state and switching from the second operation state to the first operation state.

In the embodiment of the present invention, when a foldable screen is used, the operation state switch is determined by whether the information of fold operation is detected. The detecting operation may be different according to different features of different foldable screens.

In an embodiment, the method may be applied to the splicing screen. In an example, the detecting operation may include: determining a first angle between the two display sub-units by a sensor at hinge/axis part of the two display sub-units; and determining that a fold operation is performed on the display unit if the first angle is greater than or smaller than a threshold. In specific implementations, the preset thresholds are different as the detected angles are different. For example, in a case that the angle between back surfaces of the two display sub-screens is detected, it is determined that there is a fold operation if the angle is smaller than a certain threshold; in a case that the angle between front surfaces of the two display sub-screens is detected, it is determined that there is a fold operation if the angle is greater than a certain threshold. In another example, a sensor is provided at front surfaces or back surfaces of the two display sub-units; and it is determined that a fold operation is performed on the display unit if data detected by the sensor meets a preset condition. The sensor may be a distance sensor. For example, if the distance sensor is provided at the back surface of the display sub-unit, it is determined that a fold operation is performed on the display unit when the distance between the two display sub-units detected by the distance sensor is smaller than a certain threshold.

In another embodiment, the method may be applied to the flexible display screen. In an example, the detecting operation may include: determining whether a fold operation is performed on the display unit by a sensor provided in the display unit. For example, an array of microswitches may be provided at preset coordinate positions of the display screen, the microswitches are triggered after the display unit is deformed due to the fold operation; and since each microswitch is provided at a preset coordinate position, coordinate position of the fold line may be determined according to the preset coordinate position. In another example, a force sensor may be used, since force, whether press or pull force, will be changed due to the deformation, and fold points at edges formed by the fold operation may be determined, coordinates of the multiple fold points may be determined, and the position of the fold line may be determined according to the coordinates of the fold points.

Furthermore, after the fold operation is performed on the flexible screen, the display adjusting command may also include the position of the fold line, so the display areas and boundaries of the first display area and the second display area may be determined according to the position of the fold line.

In step 103, the first display parameter of at least one display object of the display unit is adjusted according to the display adjusting command, to generate the second display parameter of the at least one display object, and the at least one display object is displayed according to the second display parameter.

If the method according to the embodiment of the present invention is used in the foldable screen, both the fold and unfold operations will result in certain adjustment of the display object. For fold operation, the content displayed for the big screen is needed to be processed, such as zoomed out, shifted or rotated, and then adjusted to another display region. For unfold operation, in order to achieve a better visual effect, the display content of one of the small screens will be enlarged and displayed in the big screen formed by the unfold operation. For the unfold operation, the display object of the two display sub-regions will be processed, such as zoomed out, shifted or rotated, and then adjusted to the big display region formed by the combination of the display sub-regions.

In the embodiment of the present invention, adjusting the first display parameter of the at least one display object of the display unit according to the display adjusting command to generate the second display parameter of the at least one display object, and displaying the at least one display object according to the second display parameter may include the following steps:

adjusting at least one of display position, display area or display direction of the first display parameter according to the display adjusting command, to generate the second display parameter; and displaying the at least one display object according to the second display parameter, so that the at least one display object is entirely displayed in the display region in a same plane.

In an embodiment, the display area of the first display parameter may be increased to generate a second display area which is to be used as the second display parameter, where the second display area is based on a level of the deformation.

In the embodiment of the present invention, adjusting the first display parameter of the at least one display object of the display unit according to the display adjusting command to generate the second display parameter of the at least one display object and displaying the at least one display object according to the second display parameter may include the following steps:

a) determining a target display region. The target display region after the operation state switch is determined according to the display adjusting command and received display region selection information.

According to the embodiment of the present invention, the operation state switch includes switching from the first operation state to the second operation state and switching from the second operation state to the first operation state, therefore, the specific implementation of determining the target display region may include:

determining whether the operation state switch is switching from the first operation state to the second operation state according to the display adjusting command, and if it is, receiving the display region selection information, selecting the target display region from the first display region and the second display region according to the display region selection information; otherwise, determining the plane display region after the operation state switch as the target display region, where the plane display region is the display region formed by the first display region and the second display region in a same plane when the electronic device is in the first operation state.

b) determining the target display object. At least one display object is determined from the original display region as the first display object for which the display parameter is to be adjusted, where the original display region is the display region used before the operation state switch.

c) determining the adjustment parameter. The first display parameter of the first display object is adjusted according to the target display region and parameter information of the first display object, to generate the second display parameter.

d) displaying the corresponding object. The first display object is displayed in the target display region according to the second display parameter.

In the solution provided by the embodiment of the present invention, the operation state switch includes switching from the first operation state to the second operation state and switching from the second operation state to the first operation state. For better understanding, detailed description thereof is made in two cases.

Figure 2:
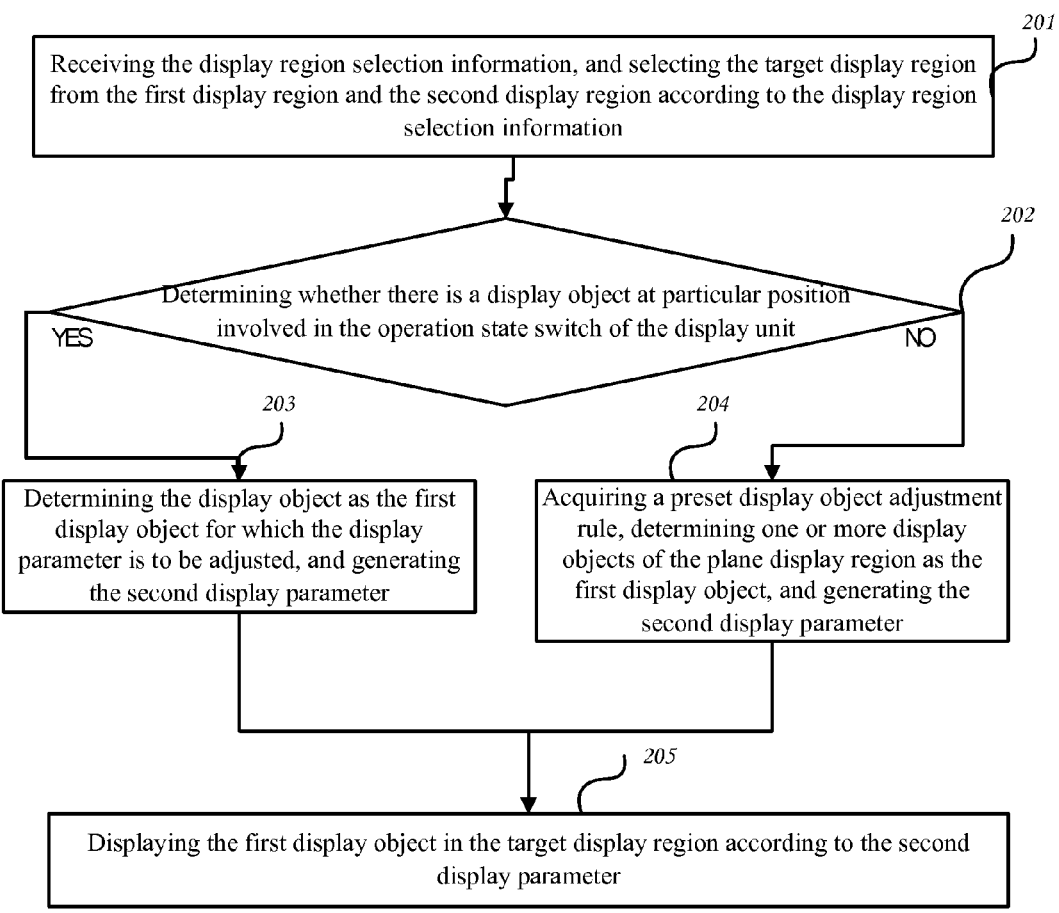
FIG. 2 is a flowchart of a method for parameter adjusting and object displaying when switching from the first operation state to the second operation state according to an embodiment of the present invention.

The first case: the operation state switch is switching from the first operation state to the second operation state (as shown in FIG. 2).

Adjusting the first display parameter of the at least one display object of the display unit according to the display adjusting command to generate the second display parameter of the at least one display object, and displaying the at least one display object according to the second display parameter includes:

step 201, receiving the display region selection information, and selecting the target display region from the first display region and the second display region according to the display region selection information;

step 202, determining whether there is a display object at a particular position involved in the operation state switch of the display unit according to position information of each display object of the original display region, and if there is, proceeding to step 203; otherwise proceeding to step 204;

step 203, determining the display object as the first display object for which the display parameter is to be adjusted, and adjusting the first display parameter of the first display object according to the display adjusting command to generate the second display parameter, and then proceeding to step 205;

step 204, acquiring a preset display object adjustment rule, determining one or more display objects of the plane display region as the first display object, and adjusting the first display parameter of the first display object according to the display adjusting command to generate the second display parameter, and then proceeding to step 205;

The one or more display objects may be: display object at top layer of the plane display screen; or displaying one or more display objects which are clicked frequently in a same display region (the same display region is the first display area or the second display region) according to a preset parameter. In specific adjustment, the method for selecting the display object needed to be adjusted may be implemented in multiple ways, and the above two ways are merely preferable ways.

step 205, displaying the first display object in the target display region according to the second display parameter.

In the case that the first operation state is switched to the second operation state (i.e., the fold operation is performed), the object needed to be adjusted is the display object at the fold line (the particular position). Further, difference between the cases of the splicing screen and the flexible screen for fold operation is that: for the splicing screen, the fold line between the first display region and the second display region is preset, so whether the display object is at the particular position can be determined by directly acquiring the stored information of the fold line; for the flexible screen, in theory, the screen can be folded at any position, so the position of the fold line dividing the first display region and the second display region is unfixed. In view of the above, in step 202, if it is determined that there is a display object at the particular position involved in the operation state switch of the display unit according to the position information of each display object of the display unit, determining the display object as the first display object for which the display parameter is to be adjusted includes:

(1) in a case that the display unit is the splicing display screen (the display unit includes the first display sub-unit and the second display sub-unit, the first display sub-unit is connected with the second display sub-unit via a pivot component), determining whether there is a display object at the particular position involved in the operation state switch of the display unit according to the position information of each display object of the original display region includes:

determining a particular display boundary between the first display unit and the second display unit as the particular position, and acquiring the pre-stored information of the particular display boundary.

In the embodiment of the present invention, the above step is described by taking the case of two display sub-units as an example, and the particular display boundary is the splicing part of the two display sub-units.

Since the splicing display screen is formed by splicing two display sub-units which are originally independent, the stored boundary information of the display sub-screens may be acquired directly when a big display screen is formed by the splicing. Therefore, the particular display boundary of the plane display region can be determined.

It is detected whether the display boundary of any of the display objects in the display unit intersects the particular display boundary, and if it is, it is determined that the any of the display objects is at the particular position involved in the operation state switch of the display unit.

(2) in a case that the display unit is the flexible display screen (the operation state is switched from the first operation state to the second operation state when the fold operation is performed on the flexible display unit), determining whether there is a display object at the particular position involved in the operation state switch of the display unit according to the position information of each display object of the original display region includes:

determining the position of the fold line according to received operation information of the fold operation; and detecting whether the display boundary of any of the display objects of the display unit intersects the fold line, and if it is, determining that the any of the display objects is at the particular position involved in the operation state switch of the display unit.

Figure 3:
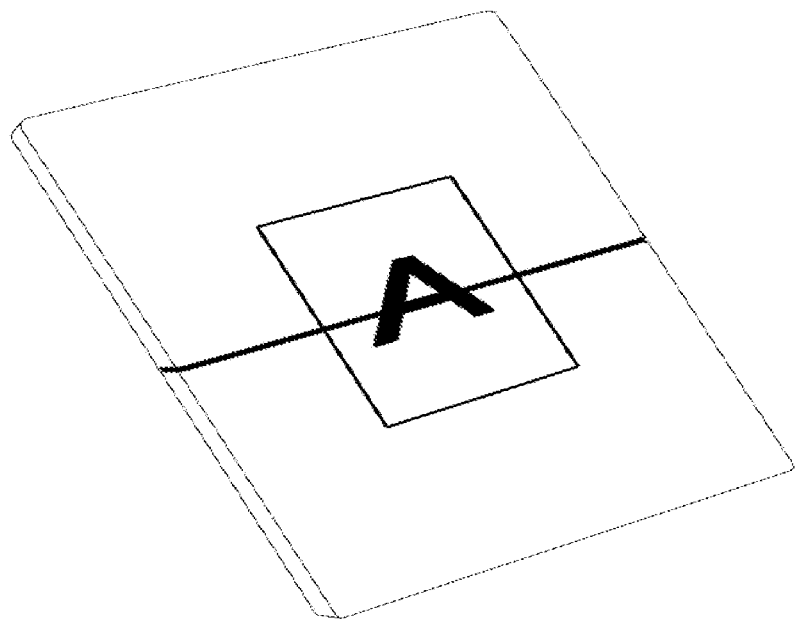
FIGS. 3 and 4 are schematic structure diagrams of splicing screen and flexible screen respectively according to embodiments of the present invention.
Figure 4:
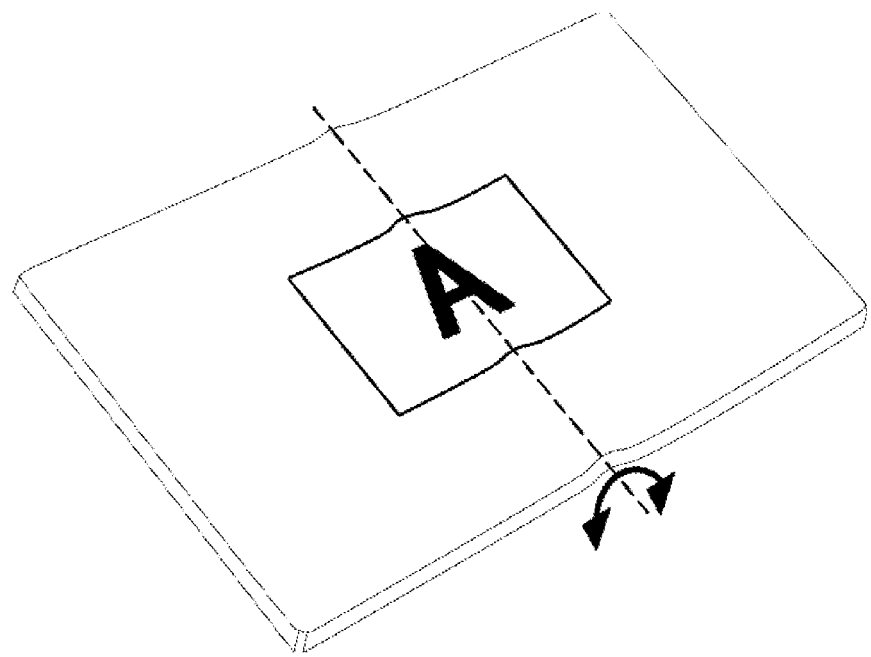

As shown in FIG. 3 (schematic diagram of a folded splicing display screen) and FIG. 4 (schematic diagram of a folded flexible screen), the embodiment of the present invention is applicable to the splicing screen and the flexible screen. In the following description, the splicing screen and the flexible screen are described in combination, where the icon of numeral+A corresponds to case of the splicing screen, and the icon of numberal+B corresponds to the case of flexible screen. There are multiple ways for processing the display object on the fold line, the first display parameter of the first display object is adjusted according to the display adjusting command to generate the second display parameter; and the first display object is displayed in the target display region according to the second display parameter. The target region selection and display object adjustment are described in detail below by taking fold operation as an example, and an implementation includes:

A) determining lengths, widths and areas of the first display region and the second display region according to the fold line after the fold operation;

B) when it is detected that a display object is at the position of the fold line (the display object intersects the fold line), detecting the length, width and area of the display object;

In the embodiment, if the display object has an irregular shape, the area or the length or the width of the display object is determined by using circumcircle or boundary rectangle of the irregular figure.

C) detecting whether the display object is displayed for the full screen, and if it is, directly zooming out the display object, otherwise proceeding to step D;

In this step, for better viewing, for the display object which was displayed for the full screen, the display object may be displayed in the whole display sub-region when being adjusted to the display sub-region for displaying. Both the length and width of the display object displayed for the full screen need to be amended.

Figure 5A:
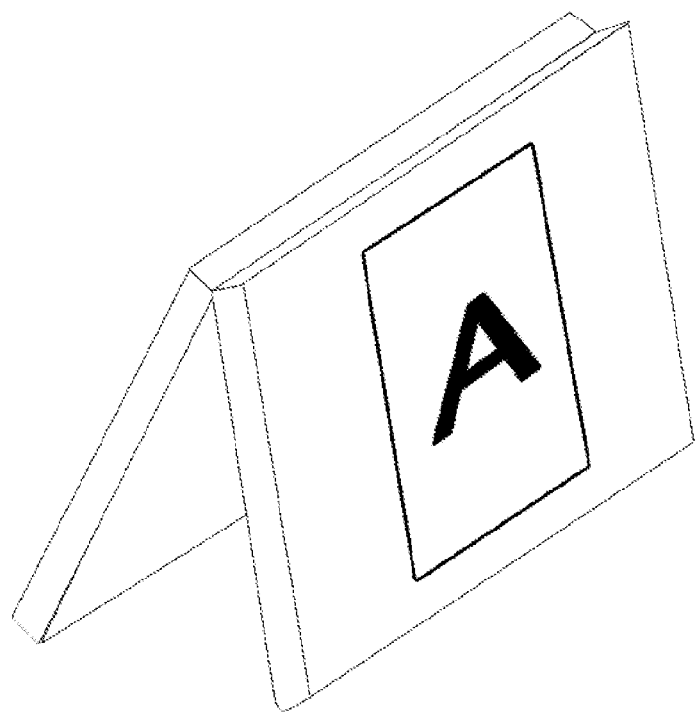
FIGS. 5A/B-9A/B are schematic diagrams of adjusting position, area and direction of display object according to embodiments of the present invention.
Figure 5B:
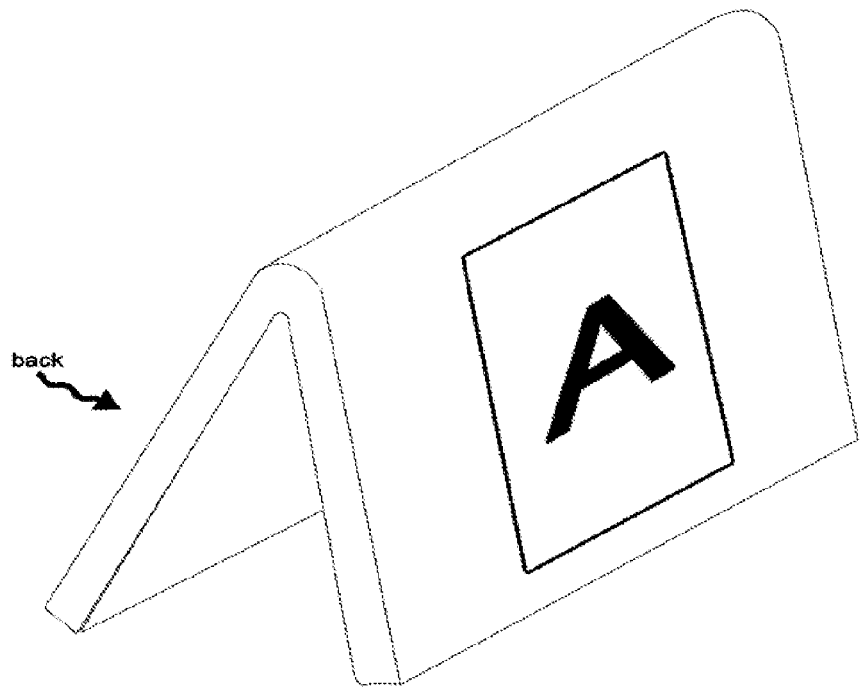

D) comparing the length, width and area of the display region with the length, width and area of the display object;

In this step, the length of the first display region is L1, the width is W1, the area is S1; the length of the second display region is L2, the width is W2, and the area is S2; the length of the display object is L3, the width is W3, and the area is S3. In the comparison, it needs to compare the length of the display object with the length and width of the display region and compare the width of the display object with the length and width of the display region, it includes the following cases:

(1) if there is a display region for which both the length and width are larger than that of the display object, shifting the display object to the display region (i.e., the target display region). In a specific implementation, it may include:

if only one of the two conditions L1>L3, W1>W3 and L2>L3, W2>W3 is satisfied, determining the first display region or the second display region as the target display region (the structure shown in FIG. 3 is converted into the structures shown in FIGS. 5A and 5B);

if both the two conditions L1>L3, W1>W3 and L2>L3, W2>W3 are satisfied, selecting the first display region or the second display region as the target display region according to a preset rule. In the embodiment of the present invention, the preset rule includes: determining the display region facing the user as the target display region; or determining the display region in which the display object occupies a larger area before the adjustment as the target display region. In the embodiment of the present invention, the preset rule is not limited to the above two ways, and in specific implementations, the rule may be set according to specific display requirements.

Figure 6A:
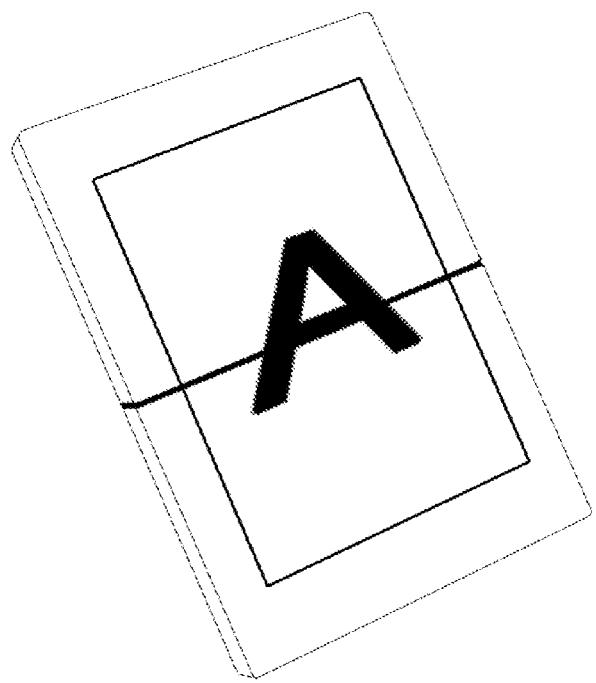
Figure 6B:
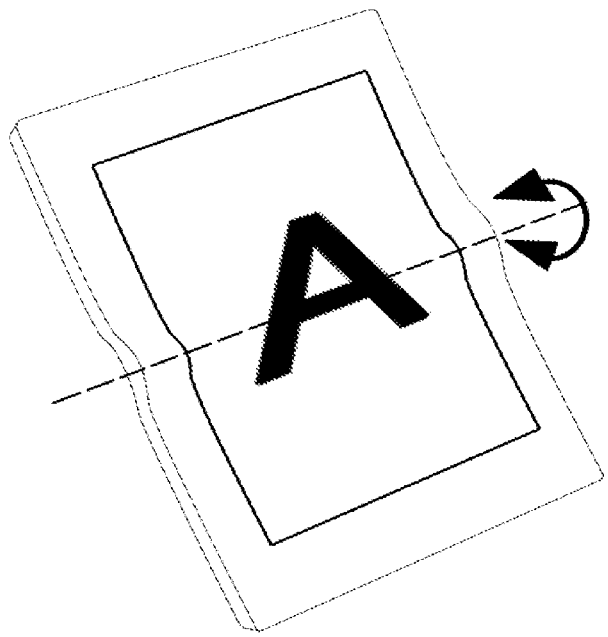
Figure 7A:
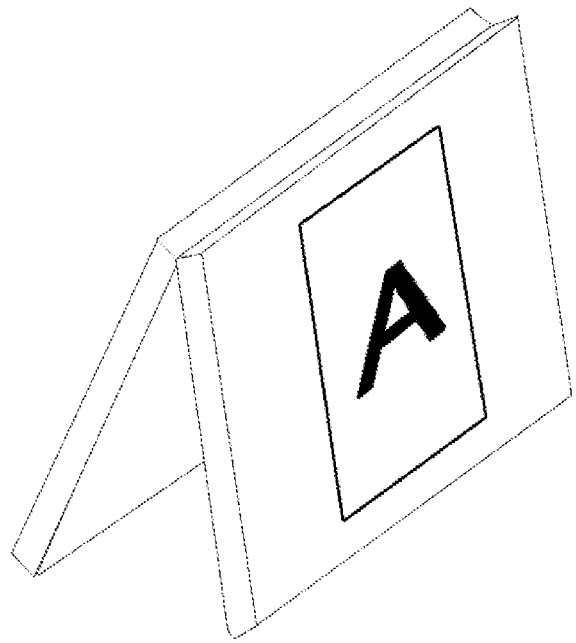
Figure 7B:
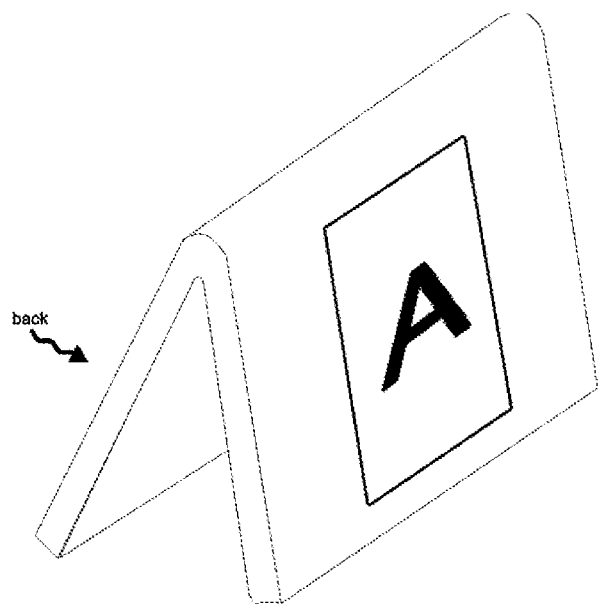
Figure 8A:
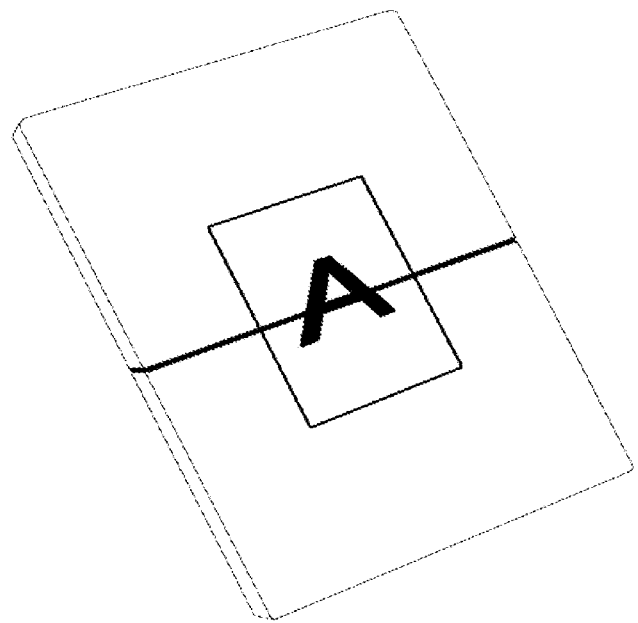
Figure 8B:
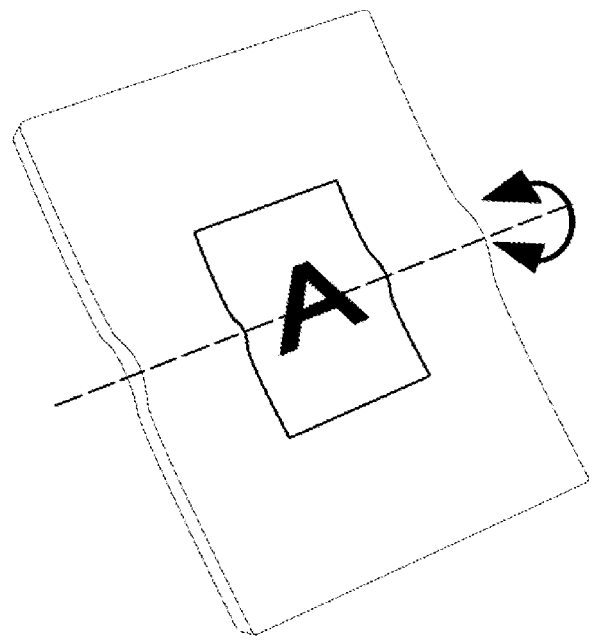

(2) if the area of the display object is larger than the area of any of the display regions, i.e., S3>S1 and S3>S2 (as shown in FIGS. 6A and 6B), scaling the display object in equal proportion according to the area of the display region, so that the area of the scaled display image is no larger than the area of the target display region; and displaying the scaled display object in the display region (as shown in FIGS. 7A and 7B);

(3) rotating the display object, <1> in the embodiment, it can be determined according to the length and width of the object; <2> it can be determined according to the rotating operation of the display unit itself. A specific implementation includes:

<1> acquiring ratios of the length and width of the display object and the two display regions (L1/W1, L2/W2, L3/W3), and if it is determined that L3/W3 is greater than 1, and both L1/W1 and L2/W2 are smaller than 1, or it is determined that L3/W3 is smaller than 1, and both L1/W1 and L2/W2 are greater than 1 (as shown in FIGS. 8A and 8B), determining any of the first display region and the second display region as the target display region, and rotating the display object. A specific rotation operation may be rotating the display image by 90 degrees in the plane (as shown in FIGS. 9A and 9B), and displaying the rotated display object in the display region.

Figure 9A:
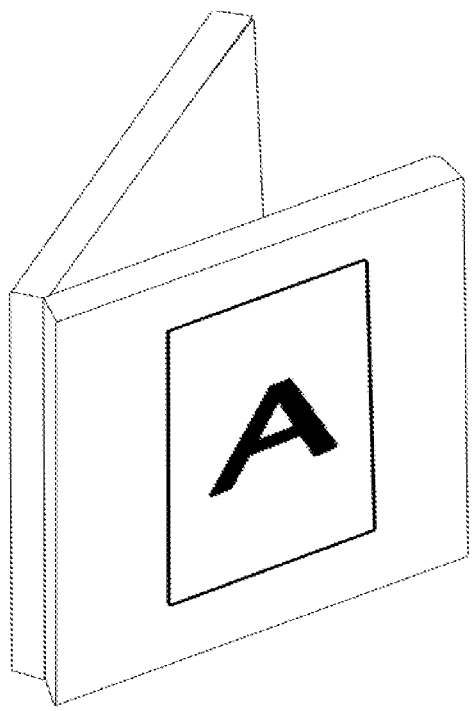
Figure 9B:
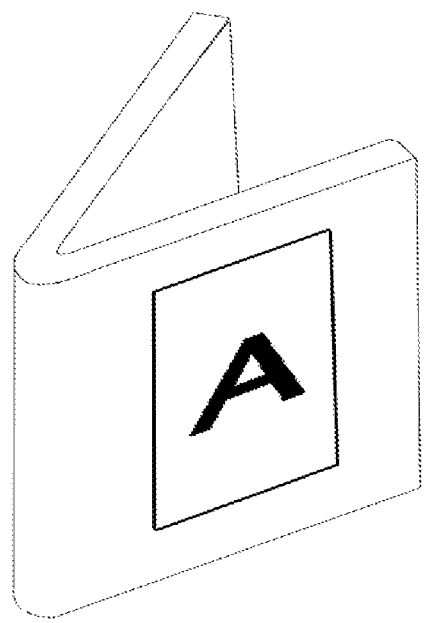

<2> if the electronic device detects both the fold operation and the rotation operation according to a sensor provided on it, adjusting the display object to any of the display sub-regions and at the same time rotating the display object (as shown in FIGS. 9A and 9B).

Figure 10A:
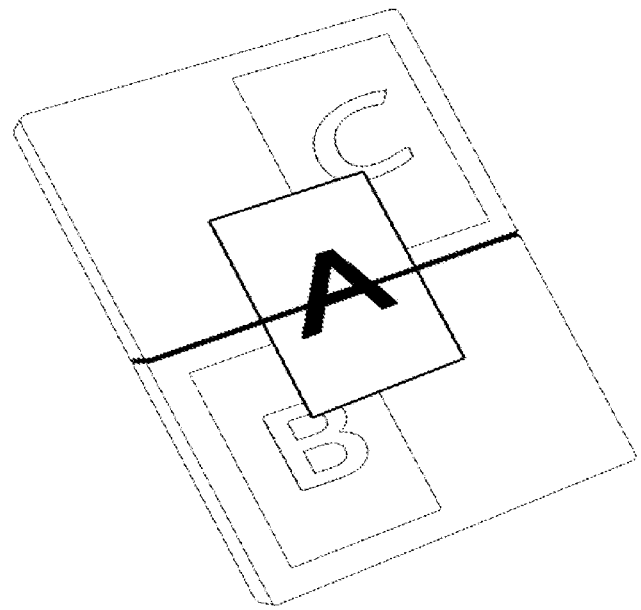
FIGS. 10A/B-12A/B are schematic diagrams of adjusting multiple objects according to embodiments of the present invention.
Figure 10B:
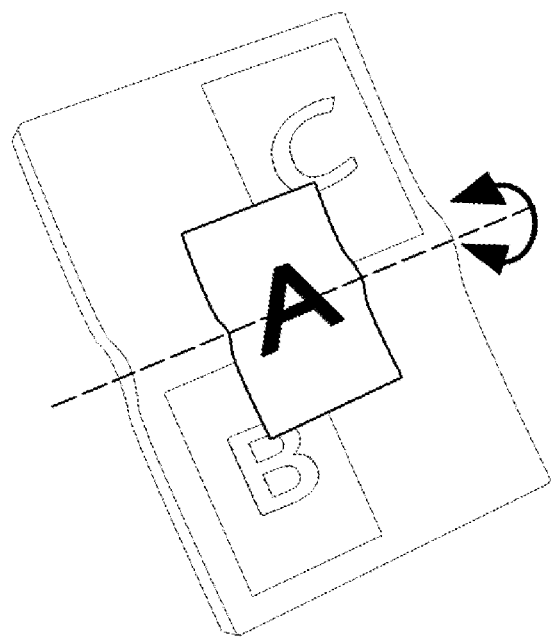

Further, the above is described for one display object. In an embodiment of the present invention, different display objects may be displayed in different display regions (as shown in FIGS. 10A and 10B).

Figure 11A:
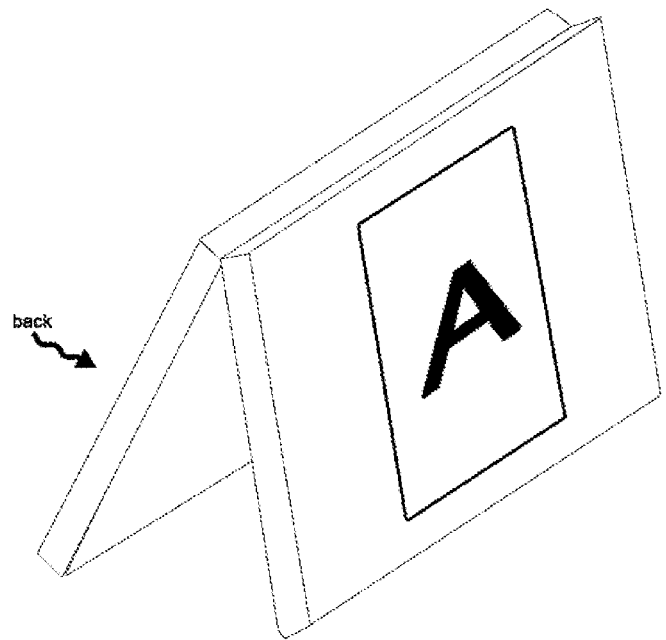
Figure 11B:
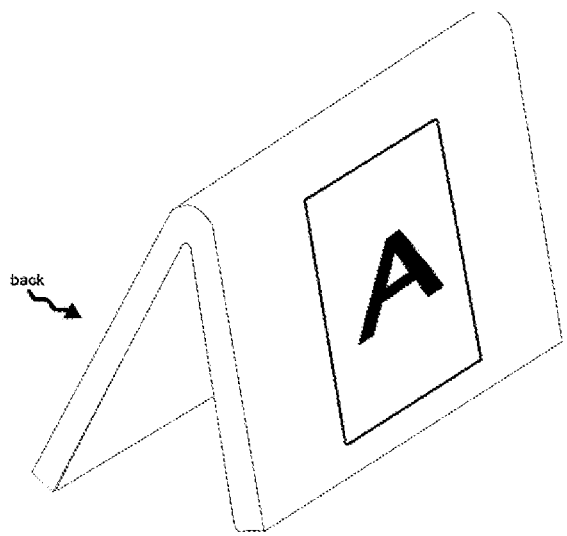
Figure 12A:
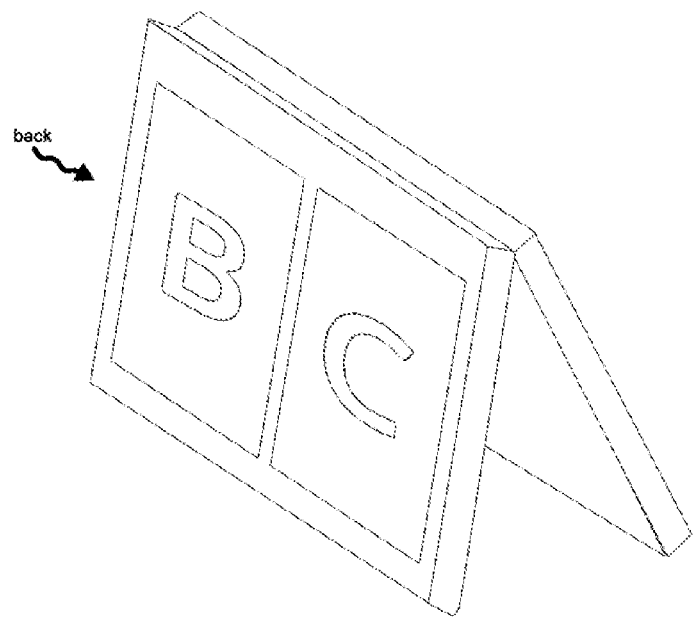
Figure 12B:
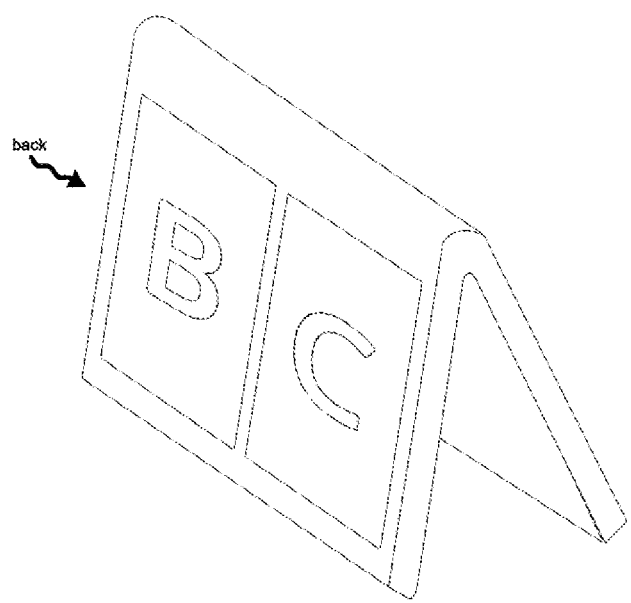

In the embodiment, multiple display objects are included, and there are multiple implementation ways for selecting the object for which the parameter is to be adjusted, preferable ways may include:

only the display object that intersects with the fold line is adjusted; only the display object at the top layer is adjusted; only display object in certain display region is adjusted; all display objects are adjusted; and display objects with different click rate are displayed in different display regions.

a) determining the boundary line of the display regions according to the fold line, and determining whether there is a display object that intersects with the fold line;

b) shifting, rotating or zooming out the display image that intersects with the fold line and then displaying it in any of the display regions (as shown in FIGS. 11A and 11B); and c) detecting the gravity direction of the back surface of the display screen, and if the gravity direction is different from that of the display screen which has not been folded, rotating the display object by 180 degrees (this is for the case of upper-lower fold, the front surface is shown as FIGS. 11A and 11B, and the back surface is shown as FIGS. 12A and 12B).

Figure 13:
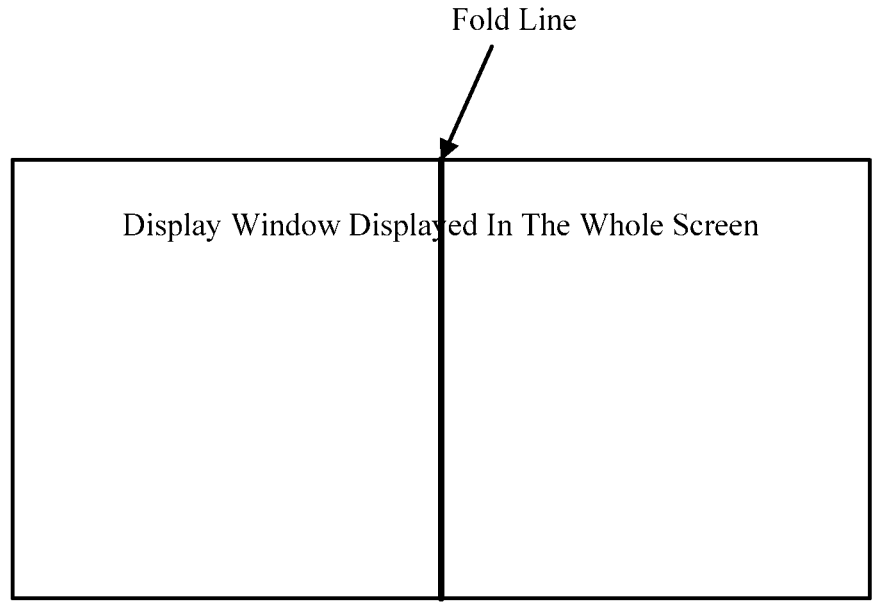
FIGS. 13-14 are schematic diagrams of adjusting display object displayed for the full screen according to embodiments of the present invention.

In another embodiment, if the first display object is displayed in the whole combined display region (as shown in FIG. 13), rearranging the first display object in the first display region or the second display region includes:

A1, if there is only one display window for the display unit currently and the display window is displayed in the full screen, determining the display window as the first display object for which the display parameter is to be adjusted (as shown in FIG. 13);

B1, determining the region boundary and display areas of the first display region and the second display region according to the coordinate of the fold line;

C1, selecting one of the first display region and the second display region as the target display region according to the display region selection information; and D1, scaling the first display object in equal proportion according to the second display parameter, so that the area of the scaled first display region is no larger than the display area of the first display region or the second display region.

In the embodiment of the present invention, there are multiple ways for adjusting the first display object as follows.

Figure 14:
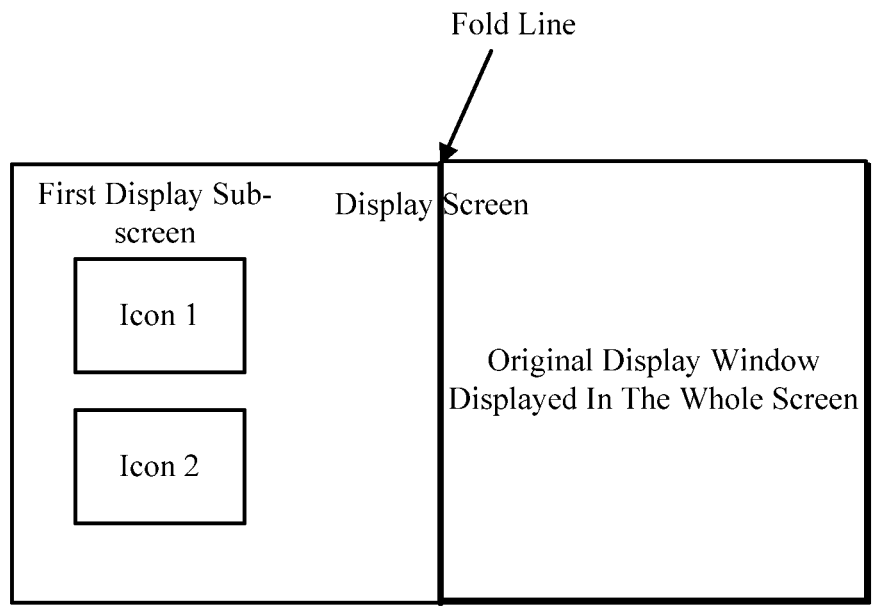

After the target display region is selected, the first object is zoomed out in equal proportion according to the ratio of the target display region and the original display region. A preferable embodiment is zooming out the first object and then displaying it in the whole target display region (as shown in FIG. 14). Or, the first object is rotated and then displayed in the target display region after being scaled. Or, the above ways may be combined, for example, the display object may be adjusted by merely zooming out or zooming in operation because any of the display objects can be displayed in any of the display regions after being zoomed out or zoomed in; or, the position may be changed while the scaling is performed; or, the image is rotated while the position is changed; or, the image is rotated while being scaled; or all of the position changing, scaling and rotating are performed for better display effect.

In the embodiment of the present invention, in order to display the content of interest in the display region facing the user after the fold operation, receiving the display region selection information and selecting the target display region from the first display region and the second display region according to the display region selection information in step 201 includes one or more of the following:

(1) monitoring whether there is user information in the monitored and scanned region at the front surfaces of the first display region and the second display region, and determining the display region, at the front of which the user information is monitored, as the target display region;

In the embodiment, the device for detecting whether there is user information in the monitored and scanned region at the front surfaces of the first display region and the second display region may be, for example, face detection device or infrared detection device.

The detection device may be provided at four corners of the display unit when being installed. Further, there are different characteristics of the splicing screen and the flexible screen. For the splicing screen, one detection device may be provided for each of the display sub-units. For the flexible screen, since the screen may be folded multiple times, information of multiple fold operations cannot be detected exactly if only one detection device is provided, therefore, a image collection array may be provided at the edge of the flexible screen, and the detection can be implemented as long as the fold involves the edge of the surface facing the user.

In the detection, if the face detection module is used to detect face information, the face information may be detected in both display regions, and a specific implementation may include:

a1, determining the distance between each of the display regions in the electronic device and the user corresponding to the face information according to the face information acquired by each of the face detection modules, and determining the display region with smaller distance as the target display region. Since the distance between the user and the electronic device is in a certain range when the user is using the electronic device, whether the user corresponding to the face information is the user using the device may be determined according to the detected distance between the face information and the electronic device, and then certain display region can be determined as the target display region.

a2, determining the number of the faces from the face detection information acquired by the face detection corresponding to each display region according to the face information acquired by each face detection module, and determining the display region with smaller number of faces as the target display region. Since in normal situation, usually only the face information of the user may be detected in the display region used by the user, while face information of multiple non-users may be detected at the back surface. Therefore, the front surface and the back surface of the electronic device may be determined exactly by using the method.

a3, acquiring the face information locally stored in the electronic device, matching the face information acquired by each face detection module with the stored face information, and determining the side for which the face information acquired by the face detection module is matched with the stored face information as the target region. Since the user of the electronic device is usually the same, the display region being used by the user, i.e., the target display region, may be determined exactly by comparing the acquired face information and the stored user face information.

(2) detecting contact areas of operators contacted with the first display region and the second display region, acquiring the first contact area and the second contact area, comparing the first contact area with the second contact area, and determining the target display region according to the comparison result;

In the embodiment, the detection device may be, for example, resistor, capacitive screen or infrared sensor.

Notes for the specific application environment include: the display screen of the electronic device may be a capacitive screen or a resistive screen, and when the user holds the electronic device, the back surface of the electronic device may be covered by the user's hand, and the front surface of the electronic device may not be covered or the covered area (i.e., the contact area) is small. Therefore, the display region of which the front surface is facing the user (i.e., the target display region) may be detected by detecting the contact area. Further, the contact area of each display region may be determined by the infrared sensor provided in the display screen.

In the above embodiment, only the implementation principles of the capacitive touch screen or the resistive touch screen are described. In specific implementations, any method that can achieve the detection of the contact area may be used in the determination step of the target region in the present invention.

In the embodiment, for simple illustration, only the touch (i.e., the contact area) is used as an example. However, in specific implementations, the target display region may be determined by detecting cross-sectional area of the operator approximating the screen (approximation area). For example, infrared sensor or infrared sensor array may be used, or ultrasonic array may be used for detection.

In the embodiment, the determination of the target region is performed for the handset electronic device. Therefore, in the embodiment, the display region with smaller contact area is determined as the target region. As the specific application environment and the selection principle are different, in some cases, the display region with larger contact area may be determined as the target region.

(3) detecting the space position information of the first display region and the second display region, and determining the display region for which the space position information meets the preset space position information standard as the target display region;

In the embodiment, the detection device may be a gyroscope, a gravity sensor or an electronic compass. In a preferable embodiment, the detection device is the gravity sensor, and a specific implementation may include:

detecting a correspondence relationship between orientation of the display unit and the gravity direction, to determine the front surface of the display unit (i.e., the target display region of the display region).

Case one, normally, the front surface of the display region usually orientates upward, that is, the direction of the front surface of the currently-used display region is opposite from the gravity direction. In this case, the display region with the direction of the front surface being opposite from the gravity direction is determined as the target display region.

Case two, in a case that the user uses the electronic device while lying, the front surface of the display region being used by the user orientates downward, that is, the direction of the front surface of the currently-used display region is the same as the gravity direction. In this case, the display region with the direction of the front surface being the same as the gravity direction is determined as the target display region.

The corresponding target display region may be selected flexibility according to various application environments, so that the finally-determined target display region can better meet the user's requirement.

(4) storing the first position of the display object displayed at top layer before the operation state switch, and after the operation state switch, determining the display region to which the first position belongs as the target display area;

During the switch operation, if the user is operating some display object, the user will still operate the same display object after the switch operation due to usage continuity. Therefore, based on the above, before the switch operation, first coordinate position of the currently-operated first display object is determined, and after the switch operation, the display region to which the first coordinate position belongs is determined as the target display region. Therefore, after the operation state switch, the adjustment for the display object is successive, and the user experience will not be affected.

(5) detecting boundary information of each display region and the first display object, and determining the display region for which the region area is greater than the display area of the first display object as the target display region;

In the embodiment, the display object needed to be adjusted is adjusted to the display region that can accommodate the display object, so that the fewest parameters are amended in the adjustment of the display object. Therefore, the whole operation and implementation are simple.

Figure 15A:
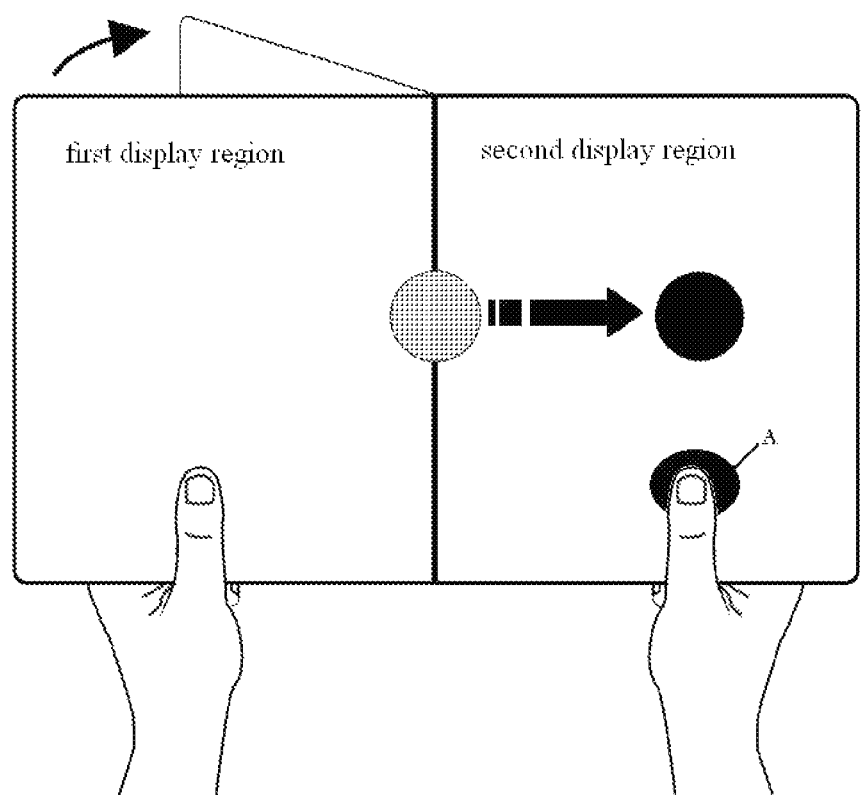
FIGS. 15A and 15B are schematic diagrams of determining target display region according to selection information input from the display screen input according to embodiments of the present invention.
Figure 15B:
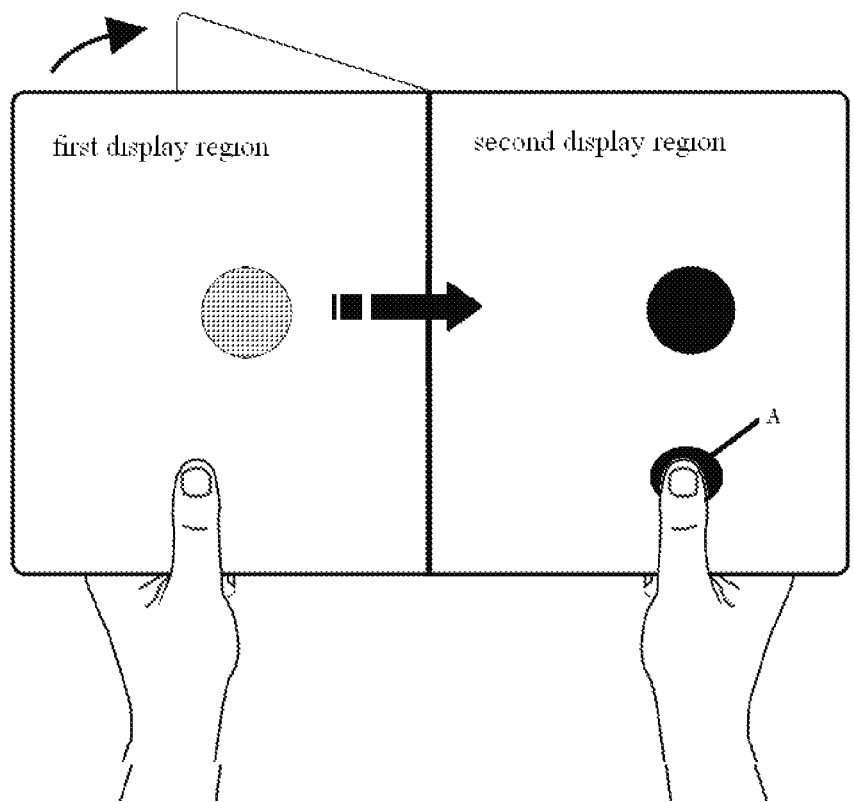

(6) setting a first touch region at particular position of the first and second display regions, and determining the display region in which the first touch region is touched longer by the user than a preset threshold as the target display region (as shown in FIGS. 15A and 15B).

In the embodiment, the region selection information is inputted directly by the user during the fold operation, so in specific implementations, besides detecting whether there is a long-time touch on the display screen, the touch area of the display region touched by the user during the fold operation may be detected. A specific implementation principle may be: when it is detected that a fold operation is performed (switching from the first state to the second state), detecting, in each of the two display regions, whether there is touch information that indicates the user touches the display region, and if there is, detecting the respective touch areas of the two display regions. A specific determination principle may be: determining the display region with the touch as the target region, where touch area with touch>touch area without touch.

According to structures of FIGS. 15A and 15B, when the first display region is folded to the back surface of the second display region during the fold operation, and a touch region A is set at the bottom of the second display region (in a specific implementation, both the first display region and the second display region are provided with the touch regions), the display region for which the touch operation on the touch region is longer than a preset time period is determined as the target display region. In the embodiment, a specific touch region is set. However, in specific implementations, it may be set that the display region for which the touch time period of the touch operation exceeds a preset value is directly determined as the target display region, if a fold operation is performed on the electronic device. In such case, the touch region A does not need to be set.

(7) detecting the first display sub-region in which the first display object locates, determining, in the first display region and the second display region, the second display sub-region which is away from the first display sub-region within a preset threshold, and determining the second display sub-region as the target display region if the second display sub-region is blank and is not deformed.

The method provided by the embodiment of the present invention is described in detail by using the specific examples shown in FIGS. 15A and 15B, the method includes:

determining whether there is a display object at the fold line position (as shown in FIG. 15A), and if there is, determining the display object on the fold line as the first display object that needs to be adjusted for displaying; otherwise, determining whether the display object currently displayed at the top layer needs to be shifted to the target display region (as shown in FIG. 15B);

detecting whether there is a touch operation with the touch time period exceeding the preset value in the touch region A of the display region, and if there is, determining the corresponding display region as the target display region; and displaying the first display object in the target display region entirely.

Figure 16:
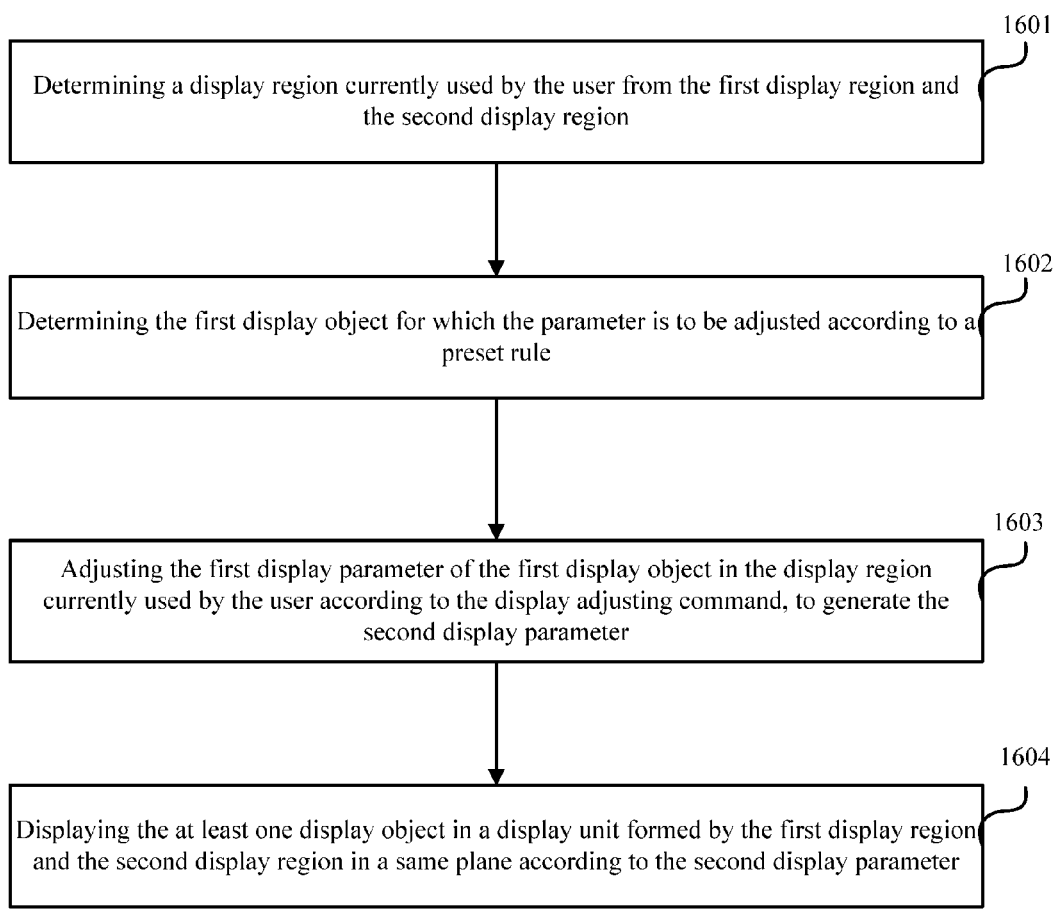
FIG. 16 is a diagram of a method for parameter adjusting and object displaying when switching from the second operation state to the first operation state according to an embodiment of the present invention.

The second case: the operation state switch is switching from the second operation state to the first operation state (as shown in FIG. 16).

Adjusting the first display parameter of at least one display object of the display unit according to the display adjusting command to generate the second display parameter, and displaying the at least one display object according to the second display parameter includes the following steps:

Since there are two display screens before the unfold operation, and both of the two display screens can display the image, there are two cases for displaying after the unfold operation:

(1) if there was only one display region that displays the content, the display content of the display region is displayed in the unfolded big display screen after the unfold operation. Since the display region becomes larger, any adjusting operation, such as one or more of enlarging, position adjusting and rotating can be performed on the display object.

(2) if both of the two display regions displayed contents, the following method may be used for selecting and displaying: in a preferable embodiment of the present invention, the display region currently used by the user is determined as the main display region, and after the unfold operation, the display object at the top layer of the main display region is displayed at the top layer of the unfolded display screen.

step 1601, determining a display region currently used by the user from the first display region and the second display region;

For the case (1), the currently-operating display region is determined as the display region that is currently used by the user.

For the case (2), the currently-used region may be determined by inputted information; or, the currently-used region may be determined by detecting user information.

step 1602, determining the first display object for which the parameter is to be adjusted according to a preset rule;

The display object at the top layer of the display region currently used by the user is determined as the first display object for which the parameter is to be adjusted.

step 1603, adjusting the first display parameter of the first display object in the display region currently used by the user according to the display adjusting command, to generate the second display parameter;

step 1604, displaying the at least one display object in a display unit formed by the first display region and the second display region in a same plane according to the second display parameter.

Figure 17:
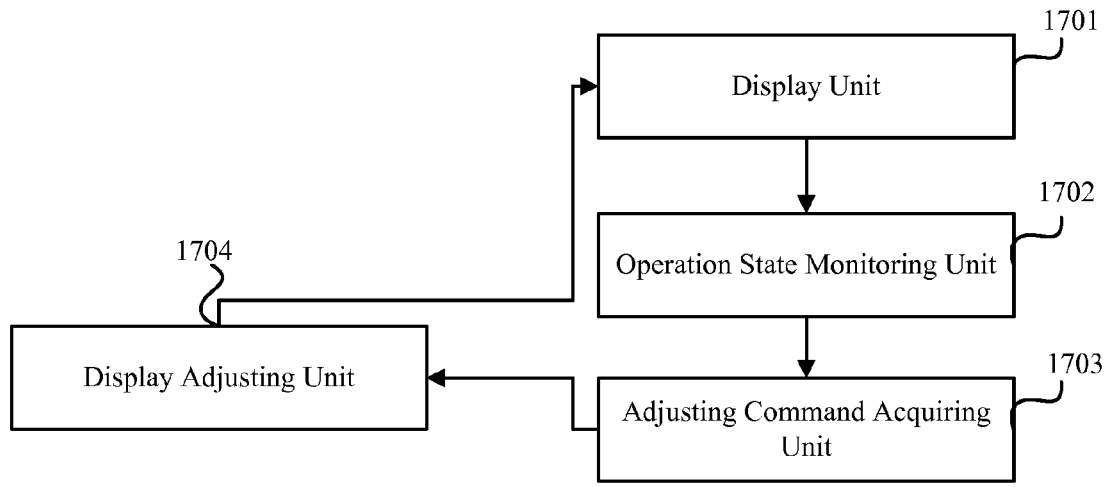
FIG. 17 is a schematic structure diagram of an electronic device according to a first embodiment of the present invention.

As shown in FIG. 17, according to the above method, an electronic device is provided by an embodiment of the present invention. The electronic device includes a display unit 1701, the display unit includes a first display region and a second display region, the electronic device has at least a first operation state and a second operation state, and the electronic device performs operation state switch if the display unit is deformed. The electronic device includes:

an operation state monitoring unit 1702, configured to display each display object of the display unit according to a first display parameter if the electronic device is in the first operation state or the second operation state, monitor the operation state of the electronic device and acquire a monitored result;

an adjusting command acquiring unit 1703, configured to acquire a display adjusting command if the monitored result indicates that the electronic device is performing the operation state switch, where the operation state switch includes switching from the first operation state to the second operation state and switching from the second operation state to the first operation state;

a display adjusting unit 1704, configured to adjust the first display parameter of the at least one display object of the display unit according to the display adjusting command, to generate the second display parameter, so that the display unit displays the at least one display object according to the second display parameter.

The display adjusting unit 1704 is further configured to adjust at least one of display position, display area and display direction of the first display parameter according to the display adjusting command, to generate the second display parameter; and display the at least one display object according to the second display parameter, so that the at least one display object is entirely displayed in a display region in a same plane.

In an embodiment, the first display region and the second display region are in a same plane if the electronic device is in the first operation state, and the first display region and the second display region are in different planes if the electronic device is in the second operation state.

Figure 18:
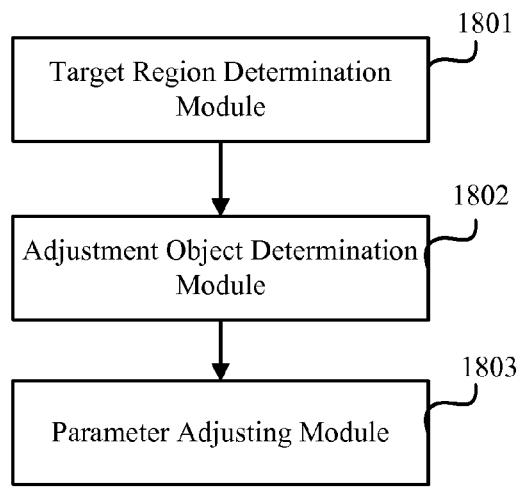
FIG. 18 is a schematic structure diagram of a display adjusting unit according to an embodiment of the present invention.

As shown in FIG. 18, the display adjusting unit 1704 further includes:

a target region determination module 1801, configured to determine a target display region after the operation state switch according to the display adjusting command and received display region selection information;

where the target region determination module 1801 is configured to determine a target display region after the operation state switch according to the display adjusting command and received display region selection information by:

determining whether the operation state switch is switching from the first operation state to the second operation state according to the display adjusting command, and if it is, receiving the display region selection information and selecting the target display region from the first display region and the second display region according to the display region selection information; otherwise, determining the plane display region after the operation state switch as the target display region, where the plane display region is a display region formed by the first display region and the second display region in a same plane if the electronic device is in the first operation state;

an adjustment object determination module 1802, configured to determine at least one display object from the original display region as the first display object for which the display parameter is to be adjusted, where the original display region is the display region used before the operation state switch is performed;

if the operation state switch is switching from the first operation state to the second operation state, the adjustment object determination module 1802 is further configured to determine whether there is a display object at a particular position involved in the operation state switch of the display unit according to position information of each display object of the original display region, and if there is, determine the display object as the first display object for which the display parameter is to be adjusted.

if the operation state switch is switching from the second operation state to the first operation state, the adjustment object determination module 1802 is further configured to determine the display object at the top layer of the first display region or the second display region as the first display object according to a preset display rule;

a parameter adjusting module 1803, configured to adjust the first display parameter of the first display object according to the target display region and parameter information of the first display object, to generate the second display parameter, so that the at least one display object is displayed in the target region of the display unit according to the second display parameter.

Figure 19:
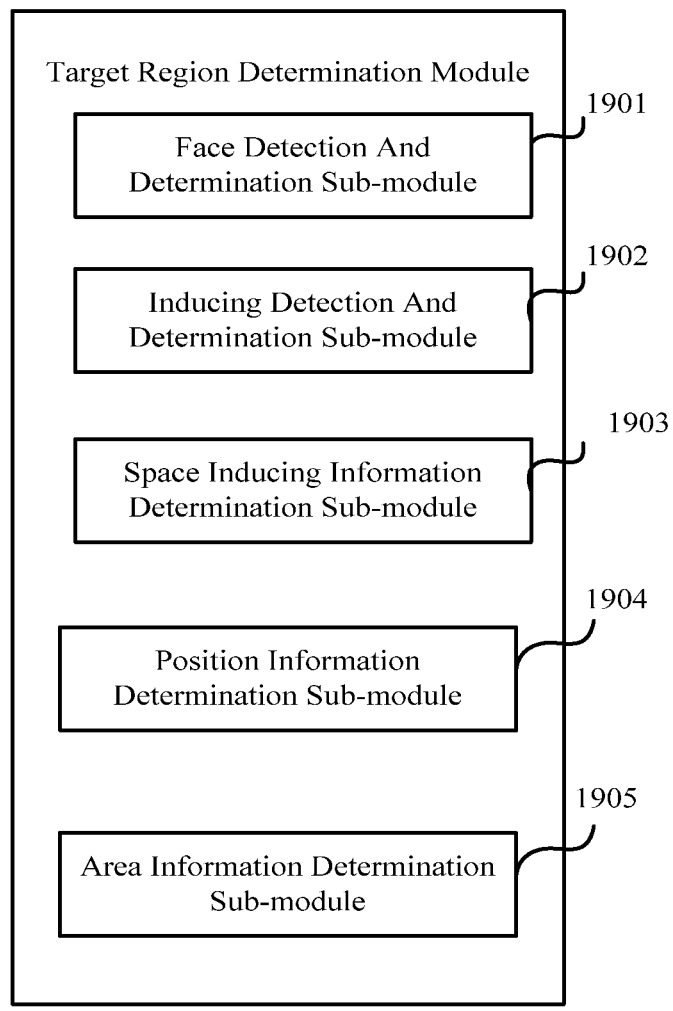
FIG. 19 is a schematic structure diagram of a target region determination module according to an embodiment of the present invention.

As shown in FIG. 19, the target region determination module 1801 includes:

a face detection and determination sub-module 1901, configured to monitor whether there is user information in monitored and scanned regions of front surfaces of the first display region and the second display region, and determine the display region, in front of which the user information is monitored, as the target display region;

an inducing detection and determination sub-module 1902, configured to detect contact areas of operators contacted with the first display region and the second display region, acquire a first contact area and a second contact area, compares the first contact area with the second contact area, and determine the target display region according to a comparison result;

a space inducing information determination sub-module 1903, configured to detect space position information of the first display region and the second display region, and determine the display region for which the space position information meets a preset space position information standard as the target display region;

a position information determination sub-module 1904, configured to store a first position of the display object at the top layer before the operation state switch, and determine the display region to which the first position belongs as the target display region after the operation state switch;

an area information determination sub-module 1905, confiqure to detect boundary information of each of the display regions and the first display object, and determine the display region for which the region area is greater than display area of the first display object as the target display region.

In an embodiment, the target region determination module 1801 includes a blank region determination sub-module, which is configure to detect a first display sub-region in which the first display object locates, determine, in the first display region and the second display region, a second display sub-region which is away from the first display sub-region by a distance within a preset threshold, and determine the second display sub-region as the target display region if the second display sub-region is blank and is not deformed.

Figure 20:
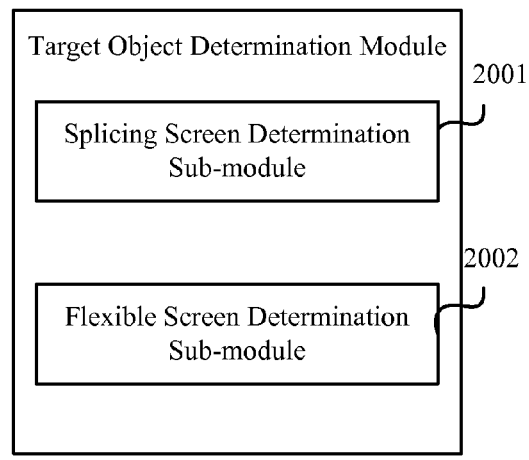
FIG. 20 is a schematic structure diagram of a target object determination module according to an embodiment of the present invention.

The display unit may be a splicing screen or a flexible screen, and the method for determining the display boundary is different for the splicing screen and the flexible screen, therefore, for different characteristics of the display units, the adjustment object determination module 1802 may include (as shown in FIG. 20):

a splicing screen determination sub-module 2001, configured to, in a case that the display unit includes a first display sub-unit and a second display sub-unit and the first display sub-unit is connected with the second display sub-unit via a pivot component, determine the particular display boundary between the first display sub-unit and the second display sub-unit as the particular position, acquire pre-stored information of the particular display boundary; detect whether there is a display object for which the display boundary intersects the particular display boundary in the display unit, and if there is, determine that the display object is at the particular position involved in the operation state switch of the display unit;

a flexible screen determination sub-module 2002, configured to, in a case that the display unit is the flexible display unit and the operation state switch is switching from the first operation state to the second operation state when a fold operation is performed on the flexible display unit, determine the position of the fold line according to received operation information of the fold operation; detect whether there is a display object for which the display boundary intersects the fold line in the display unit, and if there is, determine that the display object is at the particular position involved in the operation state switch of the display unit.

Figure 21:
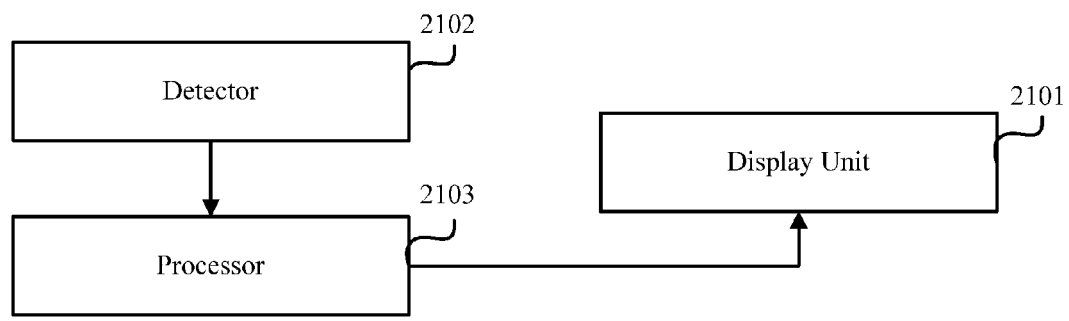
FIG. 21 is a schematic structure diagram of an electronic device according to a second embodiment of the present invention.

As shown in FIG. 21, an electronic device is provided by another embodiment of the present invention, the electronic device includes:

a display unit 2101, including a first display region and a second display region, the electronic device having at least a first operation state and a second operation state, the first display region and the second display region being in a same plane if the electronic device is in the first operation state, and the first display region and the second display region being in different planes if the electronic device is in the second operation state, each display object in the display unit being displayed according to a first display parameter if the electronic device is in the first operation state or the second operation state;

a detector 2102, configured to monitor the operation state of the electronic device, to obtain a monitored result;

a processor 2103, configured to acquire a display adjusting command if the monitored result indicates that the electronic device is performing the operation state switch, where the operation state switch includes switching from the first operation state to the second operation state and switching from the second operation state to the first operation state; adjust the first display parameter of at least one display object of the display unit according to the display adjusting command to generate a second display parameter, so that the display unit displays the at least one display object according to the second display parameter.

Figure 22:
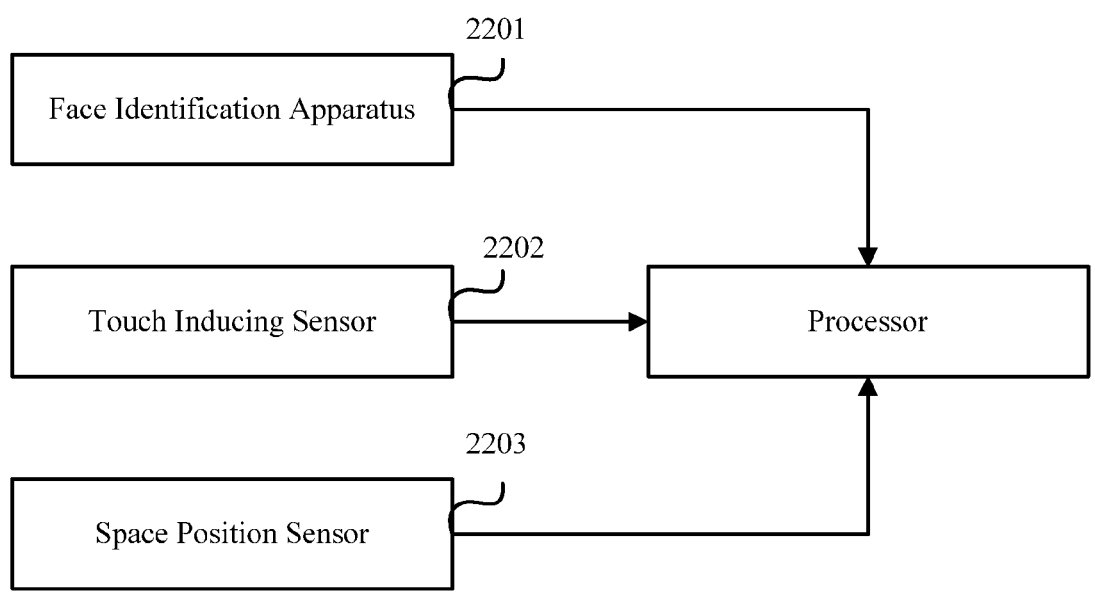
FIG. 22 is a schematic diagram of connection structure of various input information detection devices according to the second embodiment of the present invention.

As shown in FIG. 22, in order to determine the target display region more exactly, the electronic device further includes one or more of face identification apparatus 2201, touch inducing sensor 2202 and space position sensor 2203.

The face identification apparatus 2201 is configured to monitor whether there is user information in monitored and scanned regions of front surfaces of the first display region and the second display region, and determine the display region, in front of which the user information is monitored, as the target display region.

The touch inducing sensor 2202 is configured to detect contact areas of operators contacted with the first display region and the second display region, acquire a first contact area and a second contact area, compare the first contact area with the second contact area, and determine the target display region according to a comparison result.

In the embodiment of the present invention, the touch inducing sensor 2202 may be any one of resistor touch sensor, capacitive touch sensor and infrared sensor.

The space position sensor 2203 is configured to detect the space position information of the first display region and the second display region, and determine the display region for which the space position information meets a preset space position information standard as the target display region.

In the embodiment of the present invention, the space position sensor 2203 may be a device for determining the space orientation of the electronic device, such as a gyroscope, a gravity inductor and an electronic compass.

The above one or more technical solutions of the embodiments of the present invention have at least the following technical effects.

According to the method and device provided by embodiments of the present invention, the original icons and display contents can be rearranged, so the case that certain content is divided and displayed in two sub-screens after the fold operation is avoided, and the display content can be displayed entirely after the fold operation.

In addition, by detecting the direction of the screen, the screen facing the user is determined, so the current displayed content may be displayed in the sub-screen facing the user, which improves the user's experience.

In addition, icons used frequently by the user may be arranged in a same sub-screen, which facilitate the usage of the user.

According to another aspect of the present invention, for the problem that the response of the flexible screen is not exact, a display method and an electronic device are further provided by embodiments of the present invention.

In the embodiment of the present invention, it is firstly determined whether the flexible screen is deformed, where whether the flexible screen is deformed may be determined by, for example, acceleration sensor, tension sensor arranged at the back side of the flexible screen; after the flexible screen is deformed, a first deformation parameter corresponding to the deformation is acquired, for example, N pieces of acceleration information corresponding to N regions of the flexible screen are acquired; then, deformation region corresponding to the deformation is determined by the first deformation parameter; after the deformation region is determined, the first display object in the deformation region is adjusted based on the first deformation parameter, for example, display dimension, display position of the first display object is adjusted.

When controlling the flexible screen by the above solution, the deformation region of the flexible screen is determined based on the first deformation parameter of the flexible screen when the flexible screen is deformed, and thus the display parameter of the first display object of the deformation region is adjusted. Therefore, the control of the flexible screen is more exact.

In order to facilitate understanding of the above technical solution, the above technical solution will be described in detail in connection with drawings and specific embodiments.

The Fourth Embodiment

An display method is provided by an embodiment of the present invention. The display method is applied in an electronic device including a flexible screen. The electronic device is, for example, a telephone, a tablet or a laptop.

Figure 23:
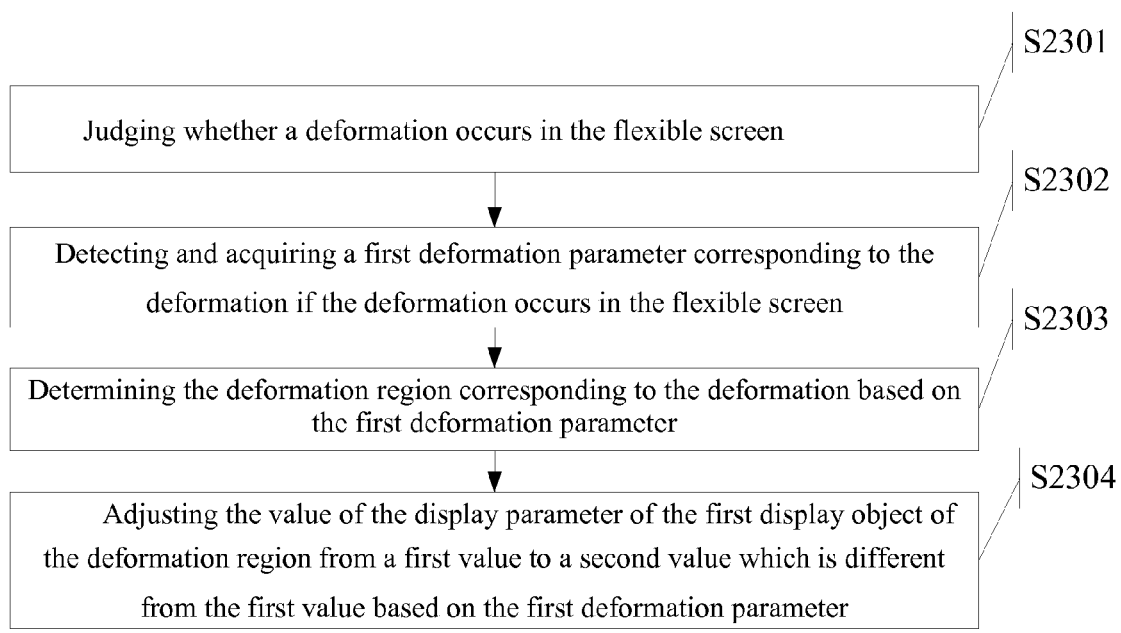
FIG. 23 is a flowchart of a display method according to a fourth embodiment of the present invention.

Referring to FIG. 23, the display method includes the following steps:

step S2301: judging whether a deformation occurs in the flexible screen;

step S2302: if the deformation occurs in the flexible screen, detecting and acquiring a first deformation parameter corresponding to the deformation;

step S2303: determining a deformed region corresponding to the deformation based on the first deformation parameter; and step S2304: adjusting a value of a display parameter for a first display object in the deformed region from a first value to a second value that is different from the first value.

In step S2301, the flexible screen may be divided into N regions, where N is an integer greater than or equal to 1; then the back side of each of the N regions is provided with one or more sensor units, and it is detected, by the sensor units, whether the deformation occurs in the flexible screen.

In specific implementations, the back side of each of the N regions may be provided with one sensor unit, for example, the sensor unit is arranged at the center of the back side of each region. Alternatively, the back side of each of the N regions may be provided with multiple sensor units, for example, the respective sensor units are arranged at four diagonals of the back side of each region, or the respective sensor units are arranged at center lines of four edges of the back side of each region. The specific arrangement of the sensor units is not limited in the embodiment of the present invention.

In specific implementations, the sensor unit may be, for example, an acceleration sensor, a tension sensor, a resistor sensor, a hall sensor or a pressure sensor. Hereafter, descriptions will be made by taking the acceleration sensor and the tension sensor as examples respectively. Judging processes with other sensors are similar, and descriptions thereof are omitted herein.

In the first case that the sensor unit is the acceleration sensor, judging whether the deformation occurs in the flexible screen includes:

detecting and acquiring first acceleration information of the flexible screen by the acceleration sensor;

judging whether the first acceleration information meets a first preset condition, where it is determined that the deformation occurs in the flexible screen if the first acceleration information meets the first preset condition.

In specific implementations, the back side of each of the N regions is provided with the acceleration sensor, so N pieces of first acceleration sub-information may be detected by the N acceleration sensors, and each of the N pieces of first acceleration sub-information includes:

acceleration sub-data in X-axis direction of the deformed region; and/or acceleration sub-data in Y-axis direction of the deformed region; and/or acceleration sub-data in Z-axis direction of the deformed region.

Current form sub-information of each of the N regions of the flexible screen may be determined by the acceleration sub-data including X, Y and Z directions which is collected by the N acceleration sensors. Current form information of the flexible screen may be determined by the N pieces of current form sub-information. And it is indicated that the deformation occurs in the flexible screen if the current form information of the flexible screen indicates that the flexible screen is folded or bent.

In the second case that the sensor is the tension sensor, judging whether the deformation occurs in the flexible screen includes:

detecting and acquiring first tension information of the flexible screen by the tension sensor;

judging whether the first tension information meets a second present condition, where it is determined that the deformation occurs in the flexible screen if the tension information meets the second preset condition.

In specific implementations, tensions usually exist among various regions of the flexible screen. Since the flexible screen has the same material, each region of the flexible screen should have the same tension if the flexible screen is not deformed, such as bent or folded.

Therefore, N pieces of tension sub-information may be detected by the tension sensors provided in the N regions. Then it is judged whether the N pieces of tension sub-information are the same or differences among the N pieces of tension sub-information are within a preset value, and if it is, it is indicated that the flexible screen is not deformed; if the differences among the N pieces of tension sub-information exceed the preset value, it is indicated that the deformation occurs in the flexible screen.

In step S2302, the detected and acquired first deformation parameter is different as the sensor unit for judging whether the deformation occurs in the flexible screen in step S2301 is different. Two cases will be described below, and the specific implementations are not limited to the two cases.

In the first case that the sensor unit is the acceleration sensor, the first deformation parameter is N pieces of first acceleration information corresponding to the N regions detected by the acceleration sensors, where each piece of acceleration sub-information includes acceleration sub-data of X, Y and Z directions.

In the second case that the sensor unit is the tension sensor, the first deformation parameter is first tension information of the flexible screen detected by the tension sensor, where the flexible screen includes N regions, so the first tension information includes N pieces of first tension sub-information corresponding to each of the N regions.

From the above, in the embodiment of the present invention, various sensors may be used to determine whether the deformation occurs in the flexible screen and detect the corresponding first deformation parameter if the deformation occurs in the flexible screen, so the deformation detection of the flexible screen is diverse.

In step S2303, the deformed region corresponding to the deformation is usually the region near the region that the deformation locates, for example, a rectangular region is obtained by taking the region where the deformation locates as a symmetrical axis and extending a preset distance, such as 10px, 20px, 50px, from the symmetrical axis to both sides, and the rectangular region is the deformed region; or, a circular region is determined by taking the symmetrical axis as a diameter, and the circular region is the deformed region. In specific implementations, other ways may be used to determine the deformed region, and the details are not described and not limited herein.

Figure 24:
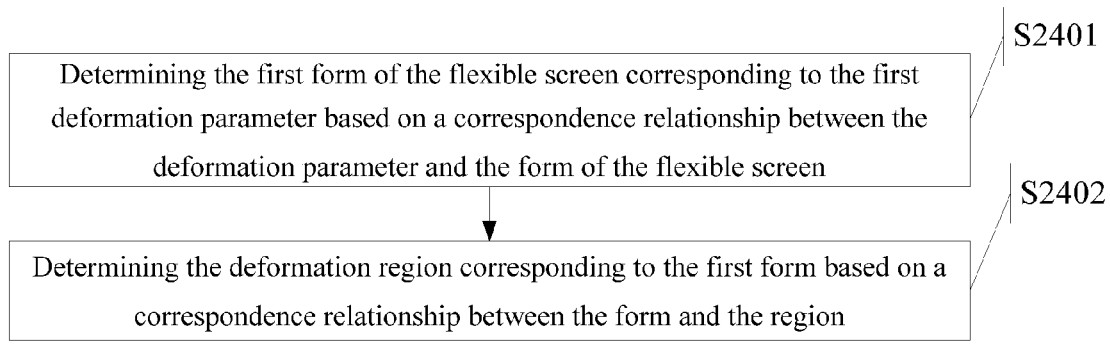
FIG. 24 is a flow flowchart of determining a deformed region according to the fourth embodiment of the present invention.
Figure 25:
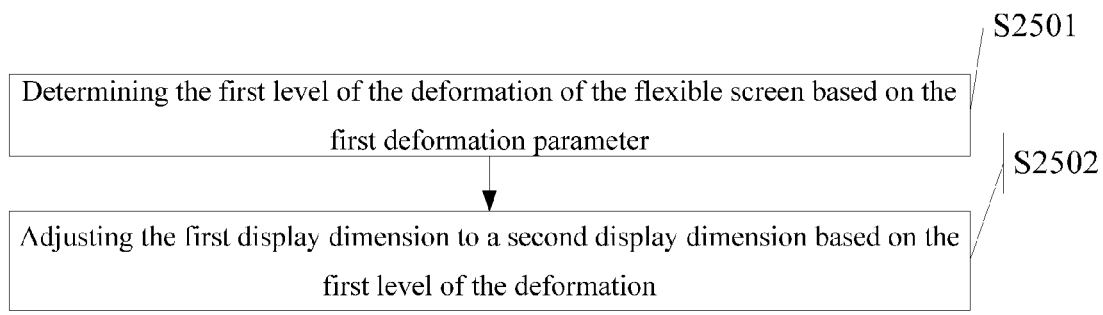
FIG. 25 is a flow flowchart of adjusting a display dimension of a first display object according to the fourth embodiment of the present invention.

In step S2303, as shown in FIG. 24, determining the deformed region corresponding to the deformation based on the first deformation parameter includes the following steps:

step S2401, determining a first form of the flexible screen corresponding to the first deformation parameter based on a correspondence relationship between the deformation parameter and the form of the flexible screen;

step S2402, determining the deformed region corresponding to the first form based on a correspondence relationship between the form and the region.

In step S2401, the first form includes, for example, deformation direction, a level of the deformation, deformation coordinate. Since the first parameter information corresponding to each of the N regions is determined in step S2302, the first form of the flexible screen may be determined by analyzing the first parameter information of each region.

In step S2402, the deformed region corresponding to the first form may be determined by the deformation coordinate of the first form determined in step S2401.

The deformed region may correspond to one region of the flexible screen, or may correspond to multiple regions, and it is not limited in the embodiment of the present invention.

In step S2304, there are multiple cases for adjusting the value of the display parameter of the first display object in the deformed region from the first value to the second value which is different from the first value. Two cases will be described below, and in specific implementations, it is not limited to the two cases.

In the first case, adjusting the value of the display parameter of the first display object in the deformed region from the first value to the second value which is different from the first value based on the first deformation parameter includes:

adjusting the display dimension of the first display object from the first display dimension to the second display dimension, where the second display dimension is greater than the first display dimension.

In specific implementations, when the deformation occurs in the flexible screen, the deformed region where the deformation occurs is bent, so the center portion of the deformation may be difficult to be touched if the display dimension is unchanged, and thus, the contact area is reduced, and the touch operation on the flexible screen may not be responded, or wrong response may be generated. For example, provided that "previous", "next", "pause" buttons are displayed on the surface of the flexible screen, and the "next" button locates in the deformed region, that is, the region of the "next" button is deformed. When the user touches the "next" button, it may not be responded since the contact area is too small; or the "pause" may be responded, because the contact area of the "pause" button is too large as the contact area of the "next" button is too small. Therefore, in the embodiment of the present invention, the display dimension corresponding to the first display may be enlarged, for example, enlarging the original dimension 100px*100px to 150px*150px, 200px*200px, or other values. In specific implementations, the display dimension of the first display object may be enlarged in equal proportion or in unequal proportion, for example, enlarging the display dimension of the first display object to 200px*100px, 300px*100px, or other values, it is not limited in the embodiment of the present invention.

From the above, in the embodiment of the present invention, since the display dimension of the first display object is adjusted from the first display dimension to the second display dimension which is greater than the first display dimension, the touchable region of the first display object is enlarged, and therefore, the response of the flexible screen is more exact.

In specific implementations, various ways may be used to determine the second display dimension, so as to adjust the first display object. Two ways will be described below, and it is not limited to the two ways in specific implementations.

(1) A preset enlarging factor of, such as 2, 4, or other value, is set. If it is detected that the deformed region is deformed, the first display object displayed on the deformed region, such as an icon or a button, is determined, and the display dimension of the first display object, such as 100px*100px, is determined. Then the second display dimension of the first display object is determined based on the enlarging factor, for example, the second display dimension is 200px*200px if the enlarging factor is 2, and the second display dimension is 400px*400px if the enlarging factor is 4.

(2) as shown in FIG. 3, it includes the following steps:

step S2501, determining the first level of the deformation of the flexible screen based on the first deformation parameter;

step S2502, adjusting the first display dimension to the second display dimension based on the first level of the deformation.

In step S2501, various ways may be used to represent the first level of the deformation. For example, if the deformation occurs in the flexible screen, the flexible screen includes at least a first plane and a second plane, and the first level of the deformation may be determined by the angle of the first plane and the second plane. The level of the deformation of the flexible screen is greater as the angle is smaller. In the embodiment, provided that the angle is 120 degree. The angle may be other values such as 70 degree or 90 degree, and it is not limited in the embodiment of the present invention. Further, the level of the deformation is greater as the tension between the first plane and the second plane is greater. Other ways may be used to represent the first level of the deformation, and it is not limited in the embodiment of the present invention.

In specific implementations, in step S2502, a correspondence relationship between level of the deformation and enlarging proportion may be preset. For example, the deformation is presented by the angle of the first plane and the second plane, and provided that the correspondence relationship is as follow:

| angle (degree) | enlarging factor |
|---|---|
| 135-180 | 2 |
| 90-135 | 4 |
| 45-90 | 6 |
| 0-45 | 8 |

The angle corresponding to the first level of the deformation is 120 degree, so the corresponding enlarging factor is 4. Therefore, the second display dimension is 400px*400px if the first display dimension is 100px*100px. In specific implementations, the specific correspondence relationship between the level of the deformation and the enlarging factor is not limited in the embodiment of the present invention.

From the above, in the embodiment of the present invention, the adjustment of the display dimension of the first display object is different as the level of the deformation of the flexible screen is different, and thus, the display control of the first display object is more exact.

In the second case, adjusting the value of the display parameter of the first display object in the deformed region from the first value to the second value which is different from the first value based on the first deformation parameter includes:

shifting the display region of the first display object from the deformed region to the second display region, where the second display region is a region which is not deformed.

In specific implementations, the touchable region of the first display object in the deformed region becomes smaller since the deformed region is deformed, so the display region of the first display object may be shifted to the second display sub-region which is not deformed.

For example, provided that the display region of the first display object is (100-200, 100-200), where the flexible screen is bent in longitudinal direction with X=150px, in such case, the first display object may be shifted to the left or to the right by at least 50px, so that the region in which the first display object is displayed is the region that is not deformed.

From the above, in the embodiment of the present invention, the display region of the first display object is shifted from the deformed region to the second display sub-region, where the second display sub-region is a region that is not folded on the flexible screen, and thus, the response of the flexible screen is more exact.

Figure 26:
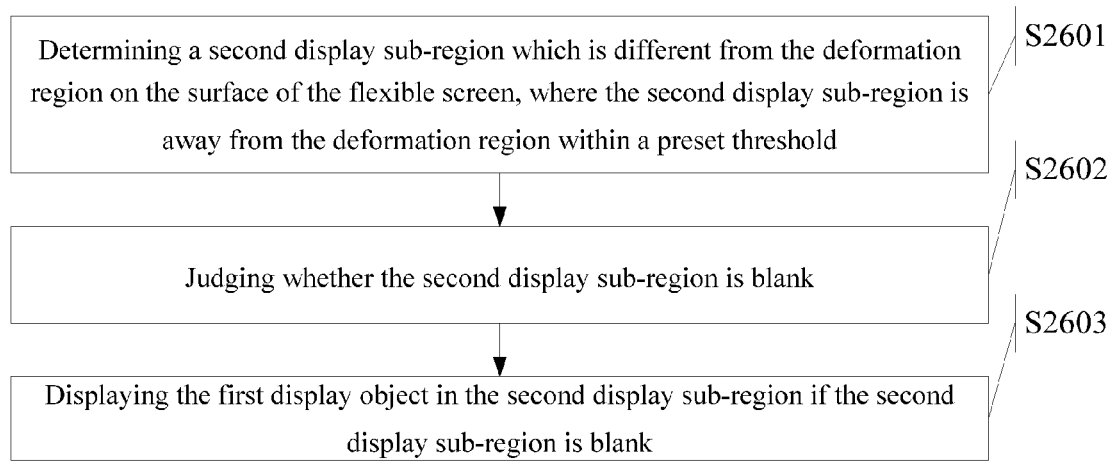
FIG. 26 is a flow flowchart of adjusting a display position of the first display object according to the fourth embodiment of the present invention.

In specific implementations, as shown in FIG. 26, shifting the display region of the first display object from the deformed region to the second display sub-region includes the following steps:

step S2601, determining the second display sub-region which is different from the deformed region on the surface of the flexible screen, where the distance between the second display sub-region and the deformed region is within a preset threshold;

step S2602, judging whether the second display sub-region is blank;

step S2603, displaying the first display object in the second display sub-region if the second display sub-region is blank.

In step S2601, for example, the distance between the second display sub-region and a first edge of the deformed region is within a preset threshold, the first edge is, for example, left edge, upper edge, and it is not limited in the embodiment of the present invention. The preset threshold may be, for example, 50px, 100px, and it is not limited in the embodiment of the present invention.

For example, the deformed region is (100-200, 100-200), the first edge is left edge, and the preset threshold is 50px, then the deformed region may be shifted left by 50px, and the second display sub-region (50-150, 100-200) is obtained; or the deformed region may be shifted right by 50px, and the second display sub-region (150-250, 100-200) is obtained. In specific implementations, the specific way to obtain the second display sub-region is not limited in the embodiment of the present invention.

In specific implementations, the first display object may be displayed in the second display sub-region directly, but in some cases, the second display sub-region may already include display content, and the display objects will be overlapped if the first display object is displayed in the second display sub-region. Therefore, it is judged whether the second display sub-region is blank in step S2602, that is, whether the second display sub-region displays the display object, and if the second display sub-region is blank, step S2603 in which the first display object is displayed in the second display sub-region is performed; otherwise, if the second display sub-region is not blank, another second display sub-region may be determined.

From the above, in the embodiment of the present invention, before displaying the first display object in the second display sub-region, it is judged whether the second display sub-region is blank, so the display control of the first display object is more exact.

The Fifth Embodiment

In order to describe the display method in the forth embodiment more clearly to those skilled in the art, in the fifth embodiment, provided that the electronic device is a telephone, and the method is described based on processes of user usage.

Figure 27A:
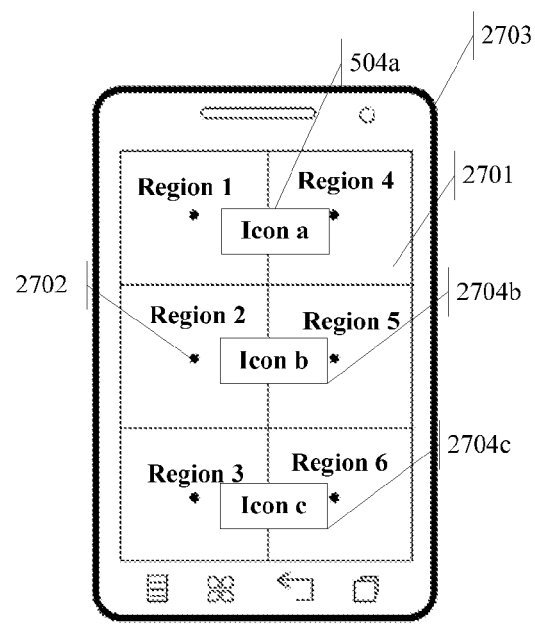
FIG. 27A is a structure diagram of a mobile phone in a case that the flexible screen of the mobile phone is in a normal state according to a fifth embodiment of the present invention.
Figure 27B:
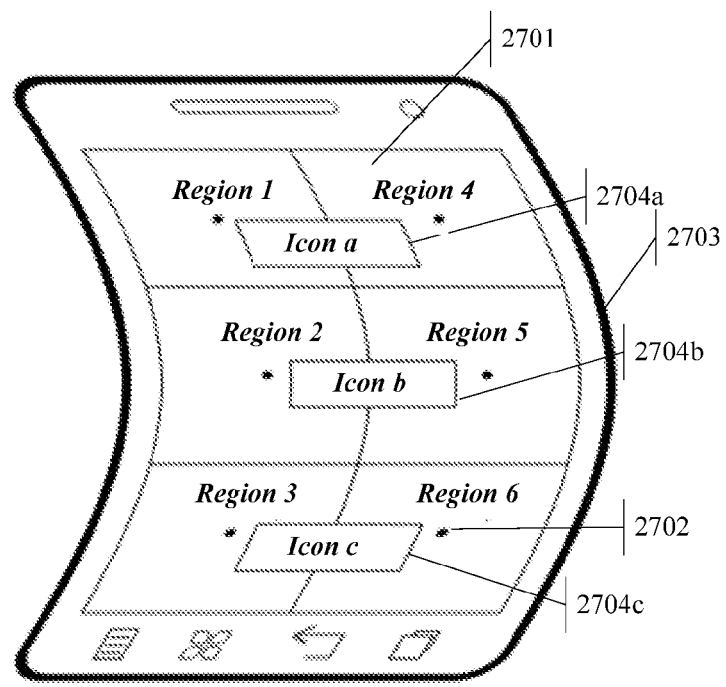
FIG. 27B is a structure diagram of a mobile phone in a case that the flexible screen of the mobile phone is deformed according to the fifth embodiment of the present invention.
Figure 27C:
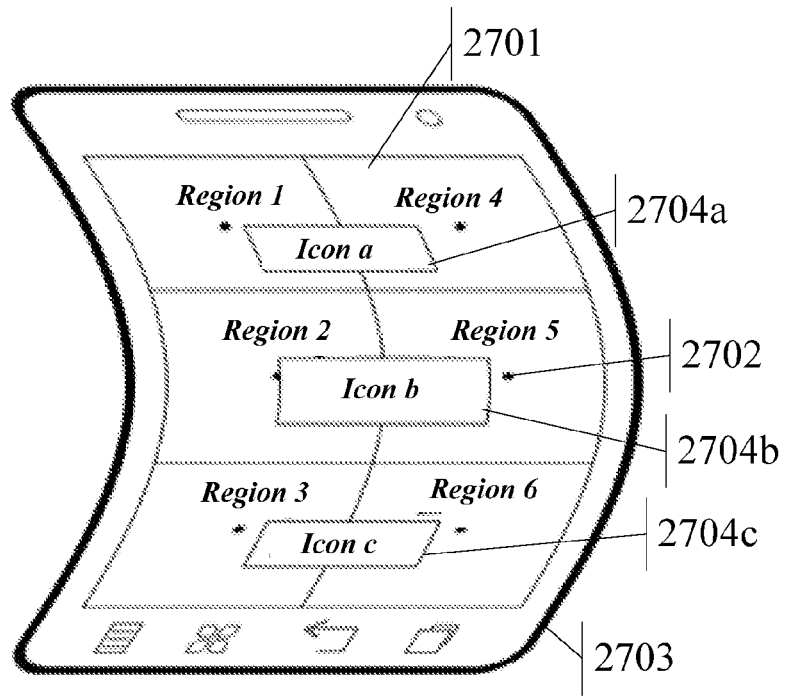
FIG. 27C is a structure diagram of a mobile phone when display dimension of the first display object is increased in a case that the flexible screen of the mobile phone is deformed according to the fifth embodiment of the present invention.

Referring to FIGS. 27a, 27b and 27c, the telephone includes:

a flexible screen 2701, which is divided into 6 regions, where there are three icons displayed on the regions of the flexible screen 2701, i.e., icon a2704a, icon b2704b and icon c2704c;

an acceleration sensor 2702, provided below each of the 6 regions of the flexible screen, where the acceleration sensor 2702 is provided at the center of each region;

a back board 2703, provided at bottom of the flexible screen 2701 and the acceleration sensor 2702.

At time T1, user A opens the telephone, as shown in FIG. 27a, the flexible screen 2701 is in a normal state. The acceleration sensor 2702 performs detection at a preset time interval to obtain 6 pieces of acceleration sub-information, and transfers the 6 pieces of acceleration sub-information to the processor of the telephone, for detecting whether the deformation occurs in the flexible screen by the processor.

At time T2, the user A folds the flexible screen 2701, as shown in FIG. 27b. After detecting the 6 pieces of acceleration sub-information, the acceleration sensor transfers the information to the processor of the telephone. By analyzing the 6 pieces of acceleration sub-information, the processor determines that the telephone is deformed and the deformed region corresponding to the deformation is (0-200, 100-200), where the icon b2704b is displayed in the deformed region, and the display dimension thereof is 25px*25px.

Then, the processor detects that the preset enlarging factor is 2, and sets the display dimension of the icon b2704b to the second display dimension 50px*50px, as shown in FIG. 27c.

The Sixth Embodiment

Based on the same inventive concept, an electronic device is provided by the sixth embodiment of the present invention. The electronic device includes a flexible screen, and the electronic device is, for example, a telephone, a tablet, a laptop.

Figure 28:
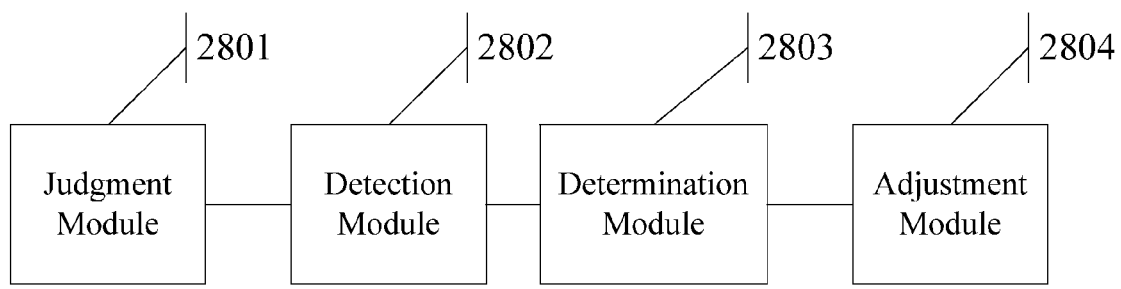
FIG. 28 is a structure diagram of an electronic device according to a sixth embodiment of the present invention.

Referring to FIG. 28, the electronic device includes:

a judgment module 2801, configured to judge whether the deformation occurs in the flexible screen;

a detection module 2802, configured to, if the deformation occurs in the flexible screen, detect and obtain a first deformation parameter corresponding to the deformation;

a determination module 2803, configured to determine a deformed region corresponding to the deformation based on the first deformation parameter;

an adjustment module 2804, configured to adjust a value of a display parameter of a first display object in the deformed region from a first value to a second value which is different from the first value based on the first deformation parameter.

In specific implementations, the flexible screen includes N regions, and a sensor unit is provided below each of the N regions.

In specific implementations, the judgment module 2801 may use various ways to judge whether the deformation occurs in the flexible screen. Two ways are illustrated below, and it is not limited to the two ways in specific implementations.

In the first way that the sensor unit is an acceleration sensor, the judgment module 2801 includes:

an acquiring unit, configured to detect and obtain first acceleration information of the flexible screen by the acceleration sensor;

a first judgment unit, configure to judge whether the first acceleration information meets a first preset condition, where it is determined that the deformation occurs in the flexible screen if the first acceleration information meets the first preset condition.

In the second way that the sensor unit is a tension sensor, the judgment module 2801 is configured to:

detect and obtain first tension information of the flexible screen by the tension sensor;

judge whether the first tension information meets a second preset condition, where it is determined that the deformation occurs in the flexible screen if the tension information meets the second preset condition.

In specific implementations, the first deformation parameter obtained by the detection module 2702 is different as the sensor unit is different. Two cases are illustrated below, and it is not limited to the two cases in specific implementations.

In the first case, the detection module 2801 is configured to:

detect and obtain N pieces of first acceleration sub-information of the first acceleration information, the N pieces of the first acceleration sub-information is the first deformation parameter.

In specific implementations, the N pieces of acceleration information are:

acceleration sub-data of X-axis direction of each of the N regions; and/or acceleration sub-data of Y-axis direction of each of the N regions; and/or acceleration sub-data of Z-axis direction of each of the N regions.

In the second case, the detection module 2802 is configured to:

detect first tension information of the flexible screen by the tension sensor, the first tension information is the first deformation parameter.

From the above, in the embodiment of the present invention, various sensors may be used to determine whether the deformation occurs in the flexible screen and detect the corresponding first deformation parameter if the deformation occurs in the flexible screen. Therefore, the deformation detection of the flexible screen is diverse.

In specific implementations, the determination module 2803 includes:

a first determination unit, configured to determine a first form of the flexible screen corresponding to the first deformation parameter based on a correspondence relationship between the deformation parameter and the form of the flexible screen;

a second determination unit, configured to determine the deformed region corresponding to the first form based on a correspondence relationship between the form and the region.

In specific implementations, the first form includes, for example, deformation direction, level of the deformation, deformation coordinate, or other forms. The first parameter information corresponding to each of the N regions may be determined by the detection module 2802, and the first form corresponding to the flexible screen may be determined by analyzing the first parameter information of each region. Then, the deformed region corresponding to the first form may be determined by the deformation coordinate of the first form.

The deformed region may correspond to only one region of the flexible screen, or may correspond to multiple regions, and it is not limited in the embodiment of the present invention.

In specific implementations, the adjustment module 2804 may use various ways to adjust the value of the display parameter of the first display object, two cases are illustrated below, and it is not limited to the two cases in specific implementations.

In the first case, the adjustment module 2804 is configured to:

adjust the display dimension of the first display object from the first display dimension to the second display dimension, where the second display dimension is greater than the first display dimension.

From the above, in the embodiment of the present invention, the display dimension of the first display object is adjusted from the first display dimension to the second display dimension which is greater than the first display dimension, so the touchable region of the first display object is enlarged. Therefore, the response of the flexible screen is more exact.

In specific implementations, the adjustment module 2804 may use various ways to determine the second display dimension, two cases are illustrated below, and it is not limited to the two cases in specific implementations.

In the first case, a preset enlarging factor is set.

In the second case, the adjustment module 2804 includes:

a third determination unit, configured to determine the first level of the deformation of the flexible screen based on the first deformation parameter;

an adjustment unit, configured to adjusting the first display dimension to the second display dimension based on the first level of the deformation.

From the above, in the embodiment of the present invention, the adjustment of the display dimension of the first display object is different as the level of the deformation of the flexible screen is different. Therefore, the display control of the first display object is more exact.

In the second case, the adjustment module 2804 is configured to:

shift the display region of the first display object from the deformed region to the second display sub-region, where the second display sub-region is the region that is not deformed.

From the above, in the embodiment of the present invention, the display region of the first display object is shifted from the deformed region to the second display sub-region, where the second display sub-region is a region that is not folded, therefore, the response of the flexible screen is more exact.

In specific implementations, the adjustment module 2804 includes:

a fourth determination unit, configured to determine the second display sub-region that is different from the deformed region on the surface of the flexible screen, where the distance between the second display sub-region and the deformed region is within a preset threshold;

a second judging unit, configured to judge whether the second display sub-region is blank;

a display unit, configured to display the first display object in the second display sub-region if the second display sub-region is blank.

From the above, in the embodiment of the present invention, before displaying the first display object in the second display sub-region, it is judged whether the second display sub-region is blank, therefore, the display control of the first display object is more exact.

The electronic device described in the sixth embodiment of the present invention is the electronic device in which the display method of the forth embodiment of the present invention is used. Therefore, based on the display method described in the forth embodiment of the present invention, those skilled in the art can understand the specific implementations and the modifications of electronic device in the sixth embodiment, so the detailed description of the electronic device is omitted. All electronic devices in which the display method of the forth embodiment can be used by those skilled in the art belong to the protection scope of the present invention.

The one or more technical solutions provided by the present invention have at least the following technical effects or advantages.

(1) In the embodiment of the present invention, the deformation region of the flexible screen is determined based on the first deformation parameter of the flexible screen when the flexible screen is deformed, and thus the display parameter of the first display object of the deformation region is adjusted, therefore the control for the flexible screen is more exact.

(2) In the embodiment of the present invention, various sensors may be used to determine whether the flexible screen is deformed and detect the corresponding first deformation parameter if the flexible screen is deformed, therefore, the deformation detection of the flexible screen is diverse.

(3) In the embodiment of the present invention, the display dimension of the first display object is adjusted from the first display dimension to the second display dimension which is greater than the first display dimension, therefore, the touchable region of the first display object is enlarged, and the response of the flexible screen is more exact.

(4) In the embodiment of the present invention, the adjustment of the display dimension of the first display object is different as the level of the deformation of the flexible screen is different, therefore, the display control for the first display object is more exact.

(5) In the embodiment of the present invention, the display region of the first display object is shifted from the deformation region to the second display sub-region, where the second display sub-region is a region that is not deformed in the flexible screen, therefore, the response of the flexible screen is more exact.

(6) In the embodiment of the present invention, before displaying the first display object in the second display sub-region, it is determined whether the second display sub-region is blank, therefore, the display control for the first display object is more exact.

Methods of the present invention are not limited to the described embodiments, and other embodiments obtained by those skilled in the art according to the technical solutions of the present invention also belong to the protection scope of the present invention.

Apparently, various amendments and modifications can be made by those skilled in the art without departing from the spirit and scope of the present invention. Therefore, the invention intends to include these amendments and modifications if the amendments and modifications belong to the scope of the claims and the equivalent techniques thereof.

The invention claimed is:

1. A display method, which is used in an electronic device, wherein the electronic device comprises a display unit, the display unit comprises a first display region and a second display region, the electronic device has at least a first operation state and a second operation state, the electronic device performs operation state switch if a deformation occurs in the display unit, the operation state switch comprises switching from the first operation state to the second operation state and switching from the second operation state to the first operation state, the method comprises:

displaying each display object of the display unit according to a first display parameter if the electronic device is in the first operation state or the second operation state;

monitoring the operation state of the electronic device to obtain a monitored result;

acquiring a display adjusting command if the monitored result indicates that the electronic device is performing the operation state switch;

determining a target display region according to the display adjusting command and display region selection information;

adjusting the first display parameter of at least one display object of the display unit according to the display adjusting command, to generate a second display parameter of the at least one display object; and displaying, in the determined target display region, the at least one display object according to the second display parameter, wherein determining the target display region according to the display adjusting command and display region selection information comprises:

detecting contact areas of operators contacted with the first display region and the second display region, obtaining a first contact area and a second contact area, comparing the first contact area with the second contact area, and determining the target display region according to a comparison result; or detecting space position information of the first display region and the second display region, and determining the display region for which the space position information meets a preset space position information standard as the target display region; or storing a first position of the display object displayed at top layer before the operation state switch, and determining the display region to which the first position belongs as the target display region after the operation state switch; or detecting boundary information of each of the first and second display regions and the at least one display object, and determining the display region for which region area is greater than display area of the at least one display object as the target display region; or detecting a first display sub-region in which the at least one display object locates, determining, in the first display region and the second display region, a second display sub-region which is away from the first display sub-region within a preset threshold, and determining the second display sub-region as the target display region if the second display sub-region is blank and is not deformed.

2. The method according to claim 1, wherein adjusting the first display parameter of at least one display object of the display unit according to the display adjusting command to generate a second display parameter of the at least one display object comprises:
adjusting at least one of display position, display area and display direction of the first display parameter according to the display adjusting command to generate the second display parameter.

3. The method according to claim 2, wherein adjusting at least one of display position, display area and display direction of the first display parameter according to the display adjusting command to generate the second display parameter comprises:
increasing the display area of the first display parameter to generate a second display area which is to be used as the second display parameter, wherein the second display area is based on a level of the deformation.

4. The method according to claim 2, wherein displaying the at least one display object according to the second display parameter comprises:
displaying the at least one display object according to the second display parameter, so that the at least one display object is entirely displayed in a display region of a same plane.

5. The method according to claim 1, wherein the first display region and the second display region are in a same plane if the electronic device is in the first operation state, and the first display region and the second display region are in different planes if the electronic device is in the second operation state.

6. The method according to claim 1, wherein adjusting the first display parameter of at least one display object of the display unit according to the display adjusting command to generate a second display parameter of the at least one display object and displaying the at least one display object according to the second display parameter comprises:
determining a first display object for which the display parameter is to be adjusted;
adjusting the first display parameter of the first display object according to the target display region and parameter information of the first display object, to generate the second display parameter; and
displaying the first display object in the target display region according to the second display parameter.

7. The method according to claim 6, wherein the first display region and the second display region are in a same plane if the electronic device is in the first operation state, the first display region and the second display region are in different planes if the electronic device is in the second operation state, and determining a target display region after the operation state switch according to the display adjusting command and received display region selection information comprises:
determining whether the operation state switch is switching from the first operation state to the second operation state according to the display adjusting command; if the operation state switch is switching from the first operation state to the second operation state according to the display adjusting command, receiving the display region selection information, and selecting the target display region from the first display region and the second display region according to the display region selection information; and if the operation state switch is not switching from the first operation state to the second operation state according to the display adjusting command, determining a plane display region after the operation state switch as the target display region, wherein the plane display region is a display region formed by the first display region and the second display region in a same plane if the electronic device is in the first operation state.

8. The method according to claim 6, wherein determining the first display object for which the display parameter is to be adjusted comprises:
determining the display object that is displayed at top layer of the first display region or the second display region as the first display object according to a preset display rule.

9. The method according to claim 6, wherein the method further comprises:
determining a particular position corresponding to the deformation; and
determining the display object at the particular position as the first display object for which the display parameter is to be adjusted.

10. The method according to claim 9, wherein the first display region is connected with the second display region via a pivot component, wherein the method further comprises:
determining a particular display boundary between the first display region and the second display region;
determining the particular display boundary as the particular position; and
determining the display object which intersects the particular display boundary as the first display object.

11. The method according to claim 9, wherein the display unit is a flexible display unit and the deformation occurs in the flexible display unit when a fold operation is performed on the flexible display unit, the method further comprises:
determining a position of a fold line according to the fold operation;
determining the position of the fold line as the particular position; and
determining the display object which intersects the fold line as the first display object.

12. The method according to claim 11, wherein:
the flexible display unit is provided with an acceleration sensor, and monitoring the operation state of the electronic device to obtain a monitored result comprises: detecting and acquiring a first acceleration of the flexible display unit by the acceleration sensor, and determining that the flexible display unit is deformed if the first acceleration meets a first preset condition; or
the flexible display unit is provided with an array of microswitches at preset coordinate positions, monitoring the operation state of the electronic device to obtain a monitored result comprises determining that the deformation occurs in the flexible display unit if the microswitches are triggered due to the deformation of the display unit, and determining the position of the fold line comprises determining a coordinate of the fold line according to the coordinate positions of the microswitches; or
the flexible display unit is provided with a force sensor, monitoring the operation state of the electronic device to obtain a monitored result comprises determining that the deformation occurs in the flexible display unit if the force sensor detects that a force is changed, and determining the position of the fold line comprises determining fold points at an edge formed by the fold operation according to the change of the force, and determining coordinates of the fold points to determine the position of the fold line.

13. An electronic device, comprising:
a display unit, configured to display each display object according to a first display parameter or a second display parameter, wherein the display unit comprises a first display region and a second display region, the electronic device has at least a first operation state and a second operation state, the electronic device performs operation state switch if a deformation occurs in the display unit, the operation state switch comprises switching from the first operation state to the second operation state and switching from the second operation state to the first operation state;

an operation state monitoring unit, configured to monitor the operation state of the electronic device to obtain a monitored result;

an adjusting command acquiring unit, configured to acquire a display adjusting command if the monitored result indicates that the electronic device is performing the operation state switch;

a target region determination module, configure to determine a target display region according to the display adjusting command and received display region selection information; and a display adjusting unit, configured to adjust the first display parameter of at least one display object of the display unit according to the display adjusting command, to generate the second display parameter of the at least one display object, so that the display unit displays, in the determined target display region, the at least one display object according to the second display parameter, wherein the target region determination module is configured to detecting contact areas of operators contacted with the first display region and the second display region, obtaining a first contact area and a second contact area, comparing the first contact area with the second contact area, and determining the target display region according to a comparison result; or detecting space position information of the first display region and the second display region, and determining the display region for which the space position information meets a preset space position information standard as the target display region; or storing a first position of the display object displayed at top layer before the operation state switch, and determining the display region to which the first position belongs as the target display region after the operation state switch; or detecting boundary information of each of the first and second display regions and the at least one display object, and determining the display region for which region area is greater than display area of the at least one display object as the target display region; or detecting a first display sub-region in which the at least one display object locates, determining, in the first display region and the second display region, a second display sub-region which is away from the first display sub-region within a preset threshold, and determining the second display sub-region as the target display region if the second display sub-region is blank and is not deformed.

14. The electronic device according to claim 13, wherein the display adjusting unit is further configured to adjust at least one of display position, display area and display direction of the first display parameter according to the display adjusting command to generate the second display parameter, so that the at least one display object is entirely displayed in a display region of a same plane.

15. The electronic device according to claim 14, wherein the display adjusting unit is further configured to:

increasing the display area of the first display parameter to generate a second display area which is to be used as the second display parameter, wherein the second display area is based on a level of the deformation.

16. The electronic device according to claim 13, wherein the first display region and the second display region are in a same plane if the electronic device is in the first operation state, and the first display region and the second display region are in different planes if the electronic device is in the second operation state.

17. The electronic device according to claim 13, wherein the display adjusting unit comprises:

an adjustment object determination module, configured to determine a first display object for which the display parameter is to be adjusted; and a parameter adjusting module, configured to adjust the first display parameter of the first display object according to the target display region and parameter information of the first display object to generate the second display parameter, so that the at least one display object is displayed in the target display region of the display unit according to the second display parameter.

18. The electronic device according to claim 17, wherein the first display region and the second display region are in a same plane if the electronic device is in the first operation state, and the first display region and the second display region are in different planes if the electronic device is in the second operation state, and the target region determination module is configured to:

determine whether the operation state switch is switching from the first operation state to the second operation state according to the display adjusting command; if the operation state switch is switching from the first operation state to the second operation state according to the display adjusting command, receive the display region selection information, and select the target display region from the first display region and the second display region according to the display region selection information; and if the operation state switch is not switching from the first operation state to the second operation state according to the display adjusting command, determine a plane display region after the operation state switch as the target display region, wherein the plane display region is a display region formed by the first display region and the second display region in a same plane if the electronic device is in the first operation state.

19. The electronic device according to claim 17, wherein the adjustment object determination module is further configured to determine the display object at top layer of the first display region or the second display region as the first display object according to a preset display rule.

20. The electronic device according to claim 17, wherein the adjustment object determination module is further configured to:

determine a particular position corresponding to the deformation; and determine the display object at the particular position as the first display object for which the display parameter is to be adjusted.

21. The electronic device according to claim 20, wherein the first display region is connected with the second display region via a pivot component, the adjustment object determination module comprises a splicing screen determination sub-module, the splicing screen determination sub-module is configured to:

determine a particular display boundary between the first display region and the second display region;

determine the particular display boundary as the particular position; and determine the display object which intersects the particular display boundary as the first display object.

22. The electronic device according to claim 20, wherein the display unit is a flexible display unit, the deformation occurs in the flexible display unit if a fold operation is performed on the flexible display unit, the adjustment object determination module comprises a flexible screen determination sub-module, the flexible screen determination sub-module is configured to:

determine position of a fold line according to the fold operation;

determine the position of the fold line as the particular position; and determine the display object which intersects the fold line as the first display object.

23. The electronic device according to claim 22, wherein:

the flexible display unit is provided with an acceleration sensor, and the operation state monitoring unit is further configured to: detect and acquire a first acceleration of the flexible display unit by the acceleration sensor; and determine that the deformation occurs in the flexible display unit if the first acceleration meets a first preset condition; or the flexible display unit is provided with an array of microswitches at preset coordinate positions, and the operation state monitoring unit is further configured to: determine that the deformation occurs in the flexible display unit if the microswitches are triggered due to the deformation of the display unit, and the flexible screen determination sub-module is further configured to determine a coordinate of the fold line according to coordinate positions of the microswitches; or the flexible display unit is provided with a force sensor, the operation state monitoring unit is further configured to determine that the deformation occurs in the flexible display unit if the force sensor detects that a force is changed, and the flexible screen determination sub-module is further configured to determine fold points at edge formed by the fold operation according to the change of the force, and determine coordinates of the fold points to determine the position of the fold line.

* * * * *